FIG. 1

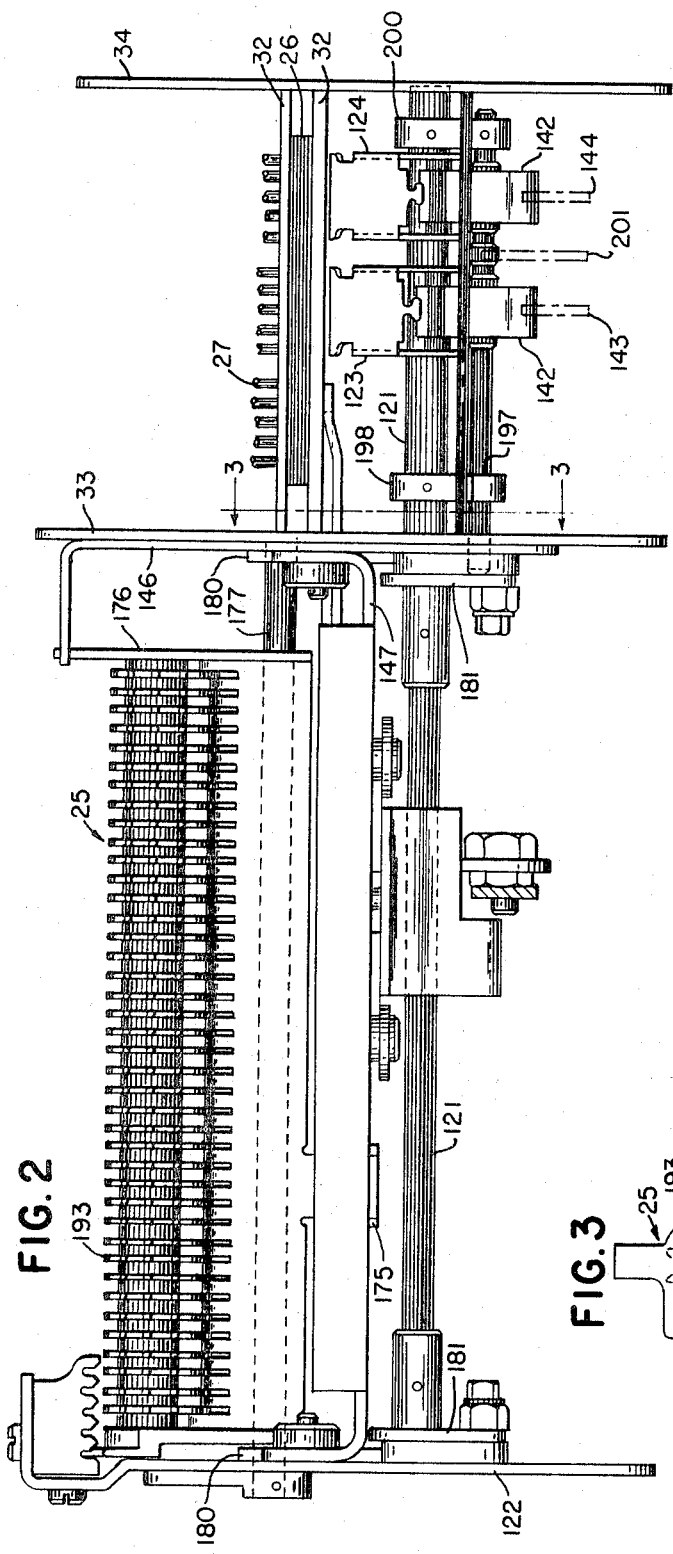

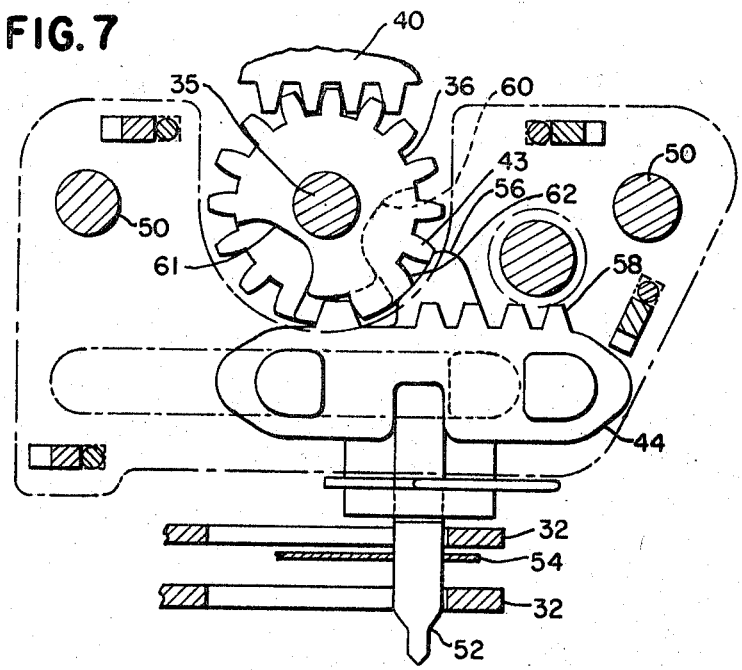
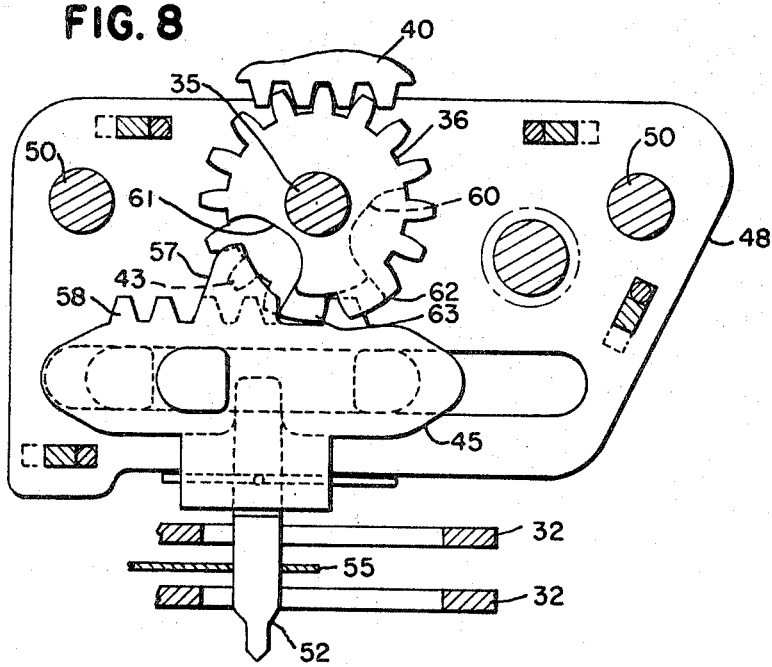

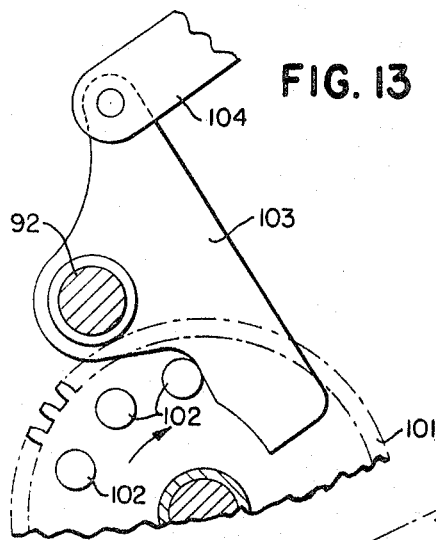
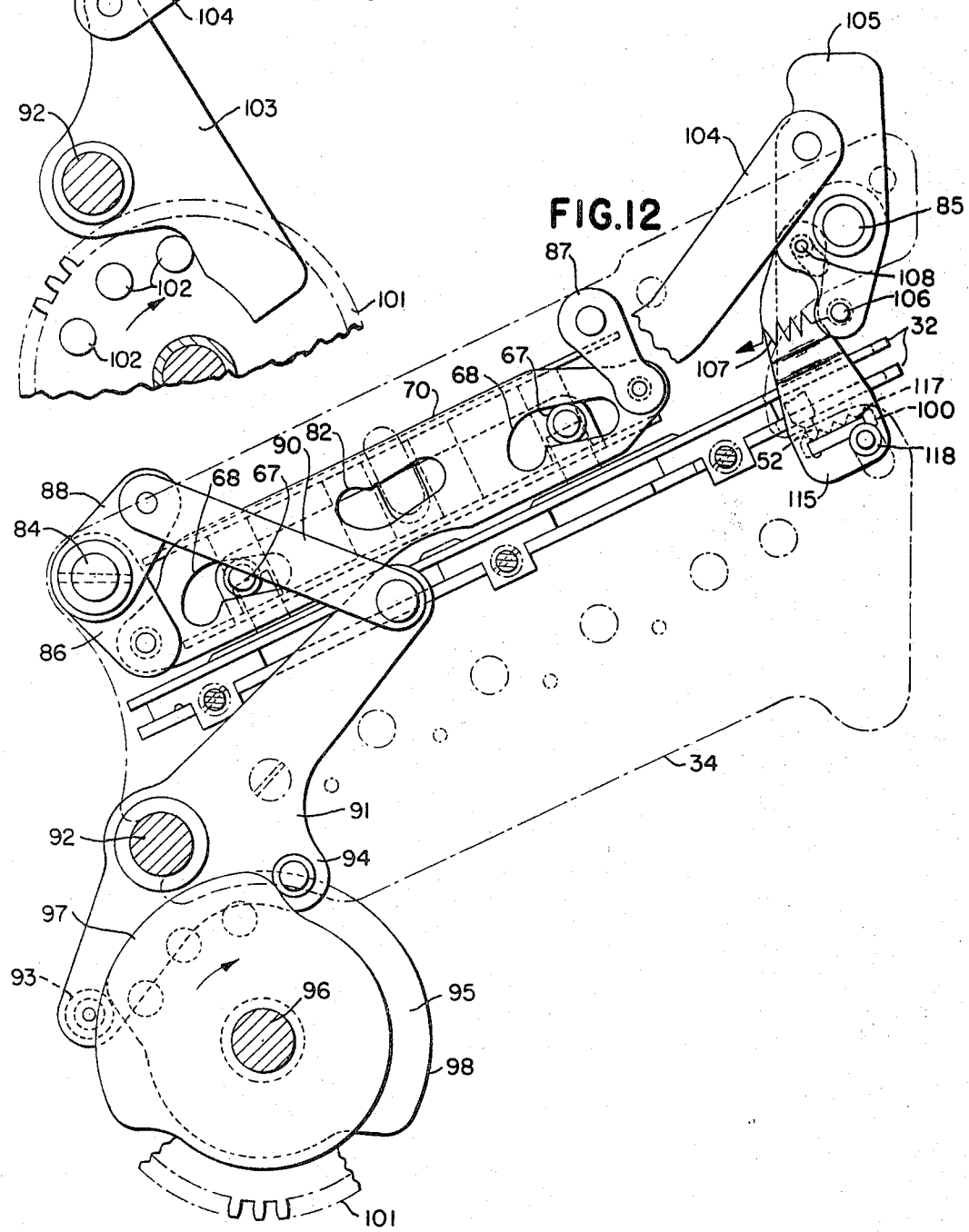

FIG. 19
FIG. 20
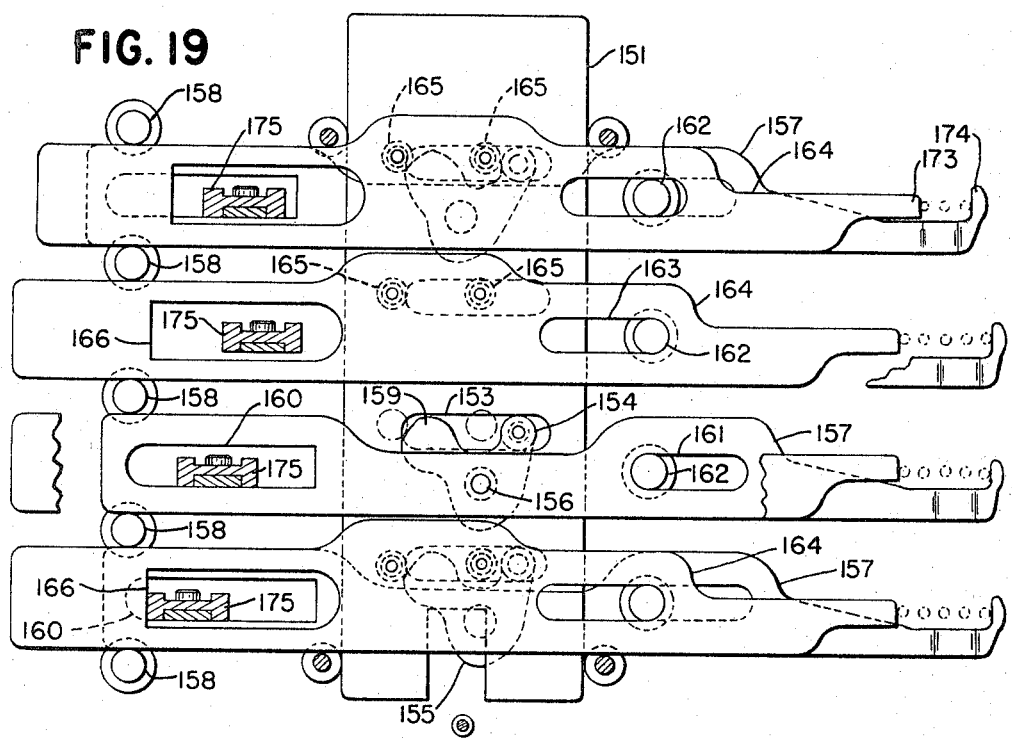
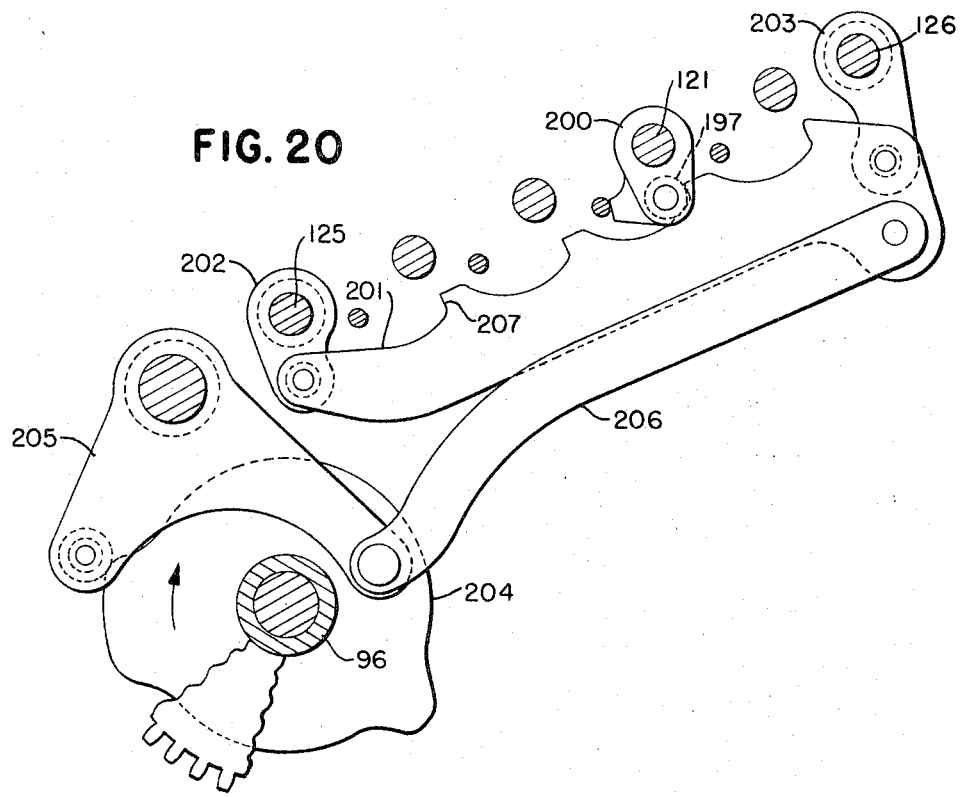

United States Patent Office
3,431,401
Patented Mar. 4, 1969

3,431,401
PROGRAMABLE FUNCTION CONTROL MECHANISM FOR BUSINESS MACHINES
Louis E. Zurbuchen, Dayton, Ohio, and Freeland R. Goldammer, Williamsville, N.Y., assignors to The National Cash Register Company, Dayton, Ohio, a corporation of Maryland
Filed Feb. 27, 1967, Ser. No. 618,598
U.S. Cl. 235—6                           21 Claims
Int. Cl. G07g 1/00

ABSTRACT OF THE DISCLOSURE

A mechanism for selectively controlling the engaging of totalizer members and the operation of printing mechanisms including a plurality of interchangeable control plates each containing a number of apertures in a predetermined position according to the functional control of the business machine desired. A mechanism for adjusting the control plates to a control position according to the control key depressed on the keyboard of the business machine. A mechanism for shifting the selected totalizer member to an operative position controlled by sensing members having sensed aligned holes in each of the adjusted control plates.

---

Present business machines which include cash registers and accounting machines are operated by depression of control keys mounted on the keyboard of the machine. Operation of these keys will, among other things, control the selection of the totalizer into which information is to be stored or from which information is to be withdrawn, the timing of the totalizer-engaging operation, and the operation of various printers contained in the machine. Depending on the type of business that is conducted, the accounting procedures that are used, and the management controls that are desired over the operation of the machine, each business machine is constructed with the control keys programmed to carry out the functions for which the machine was obtained. This has produced a situation where the majority of the machines are being constructed on a custom basis, thus increasing the cost of each machine and minimizing any opportunity to standardize the construction of the machines.

Where the business machines have been in use and modifications are desired in the functional operation of the machines due to a change in business conditions and operations, the machines have to be returned to the factory and rebuilt, thereby requiring time and labor resulting in increased costs. In order to eliminate these drawbacks in the machine construction, it is an object of this invention to provide a novel mechanism, for controlling the selection and operation of totalizers, which may easily be programmed to change the functional operation of a business machine under all possible conditions.

Another object of this invention is to provide a novel totalizer control mechanism which may be easily programmed to control the functional operation of several printing mechanisms.

A further object of the invention is to provide a novel mechanism for positioning a plurality of control plates commensurate with keys depressed on the keyboard.

Another object of this invention is to provide a novel totalizer-shifting mechanism controlled by sensing means positioned by a plurality of control plates.

With these and other incidental objects in view, the present invention includes certain novel features of construction and combinations of parts, a preferred form or embodiment of which is hereinafter described with reference to the drawings which accompany and form a part of this specification.

Figure 4:
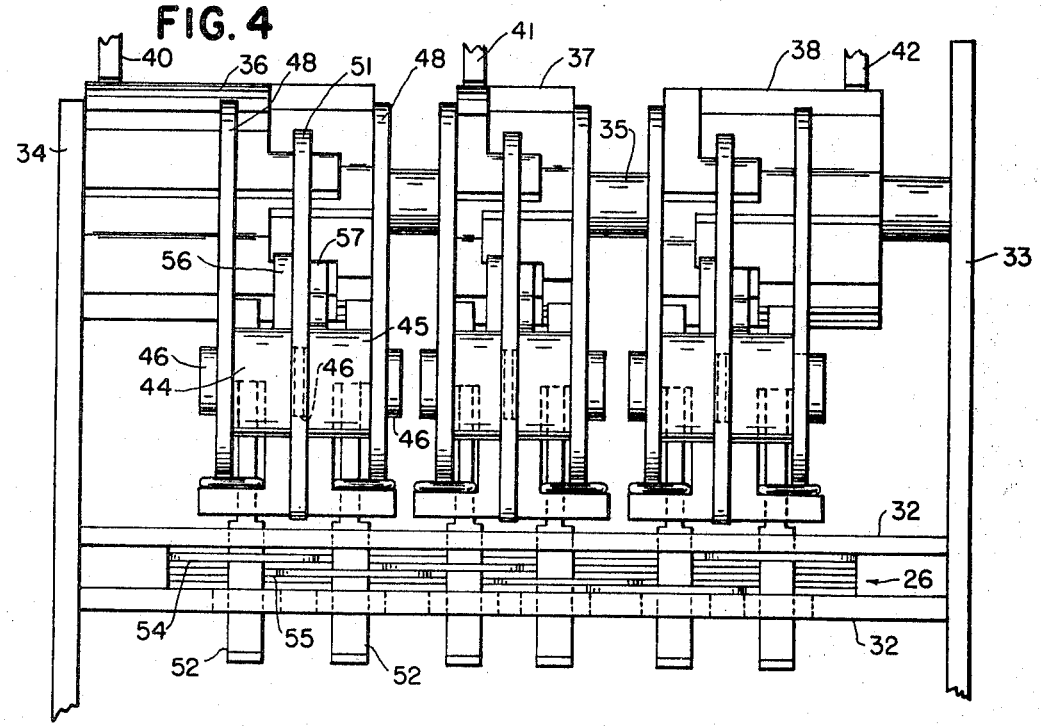
Figure 5:
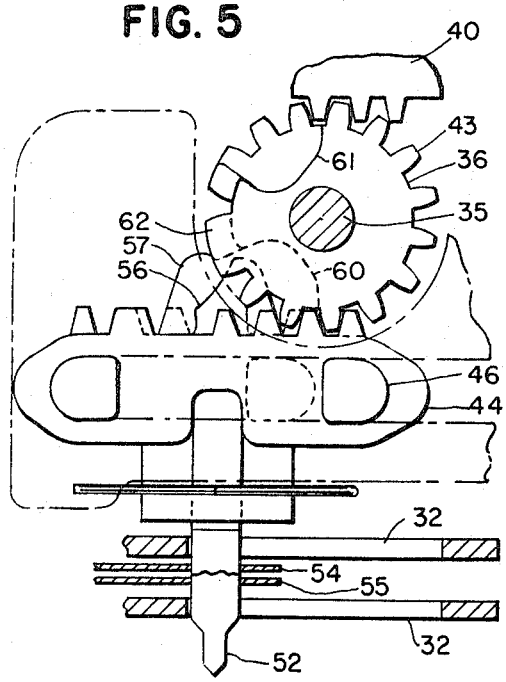
Figure 6:
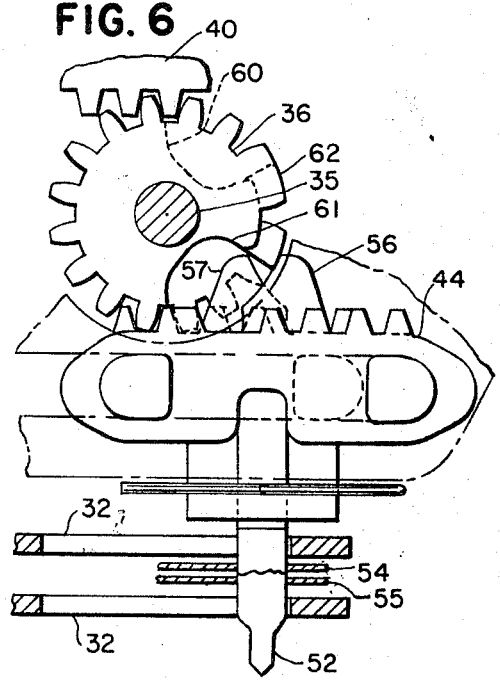
Figure 9:
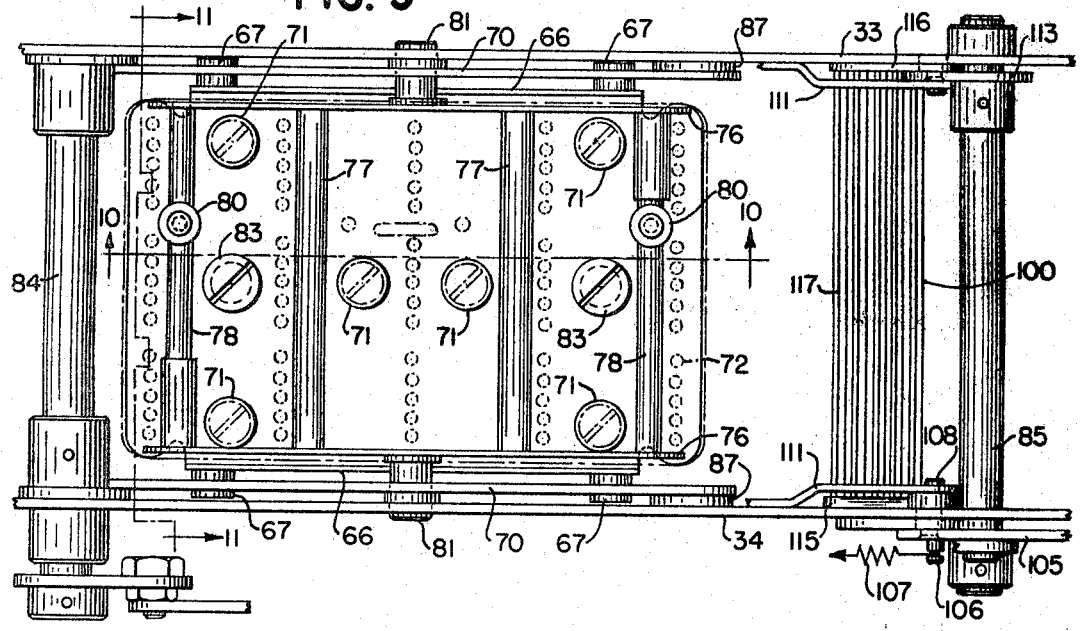
Figure 10:
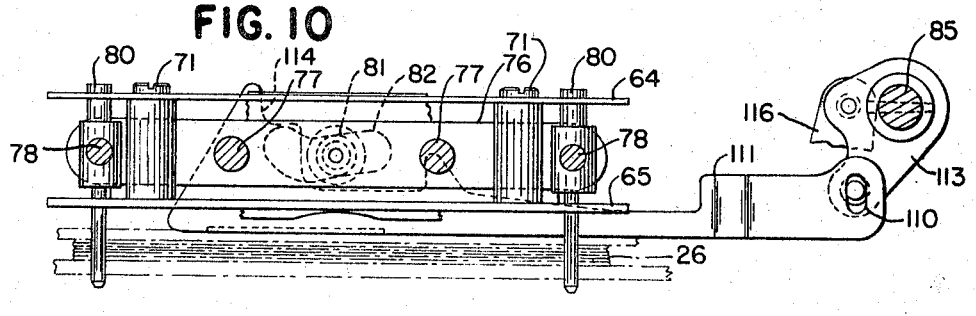
Figure 11:
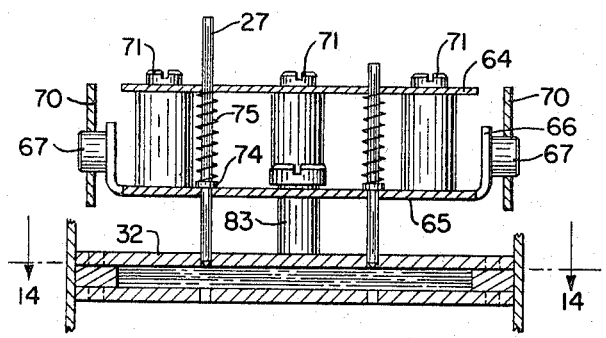
Figure 14:
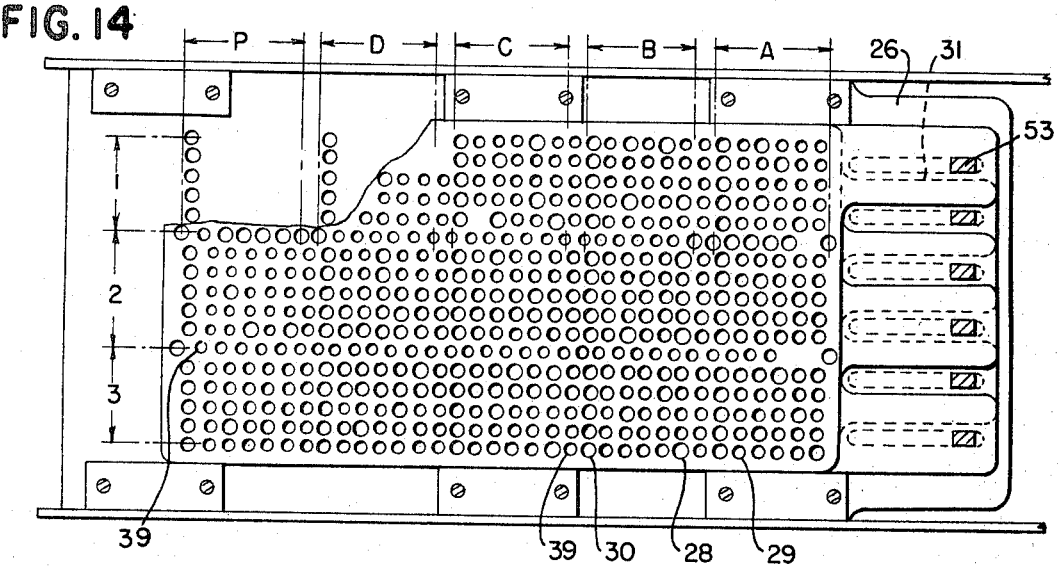
Figure 15:
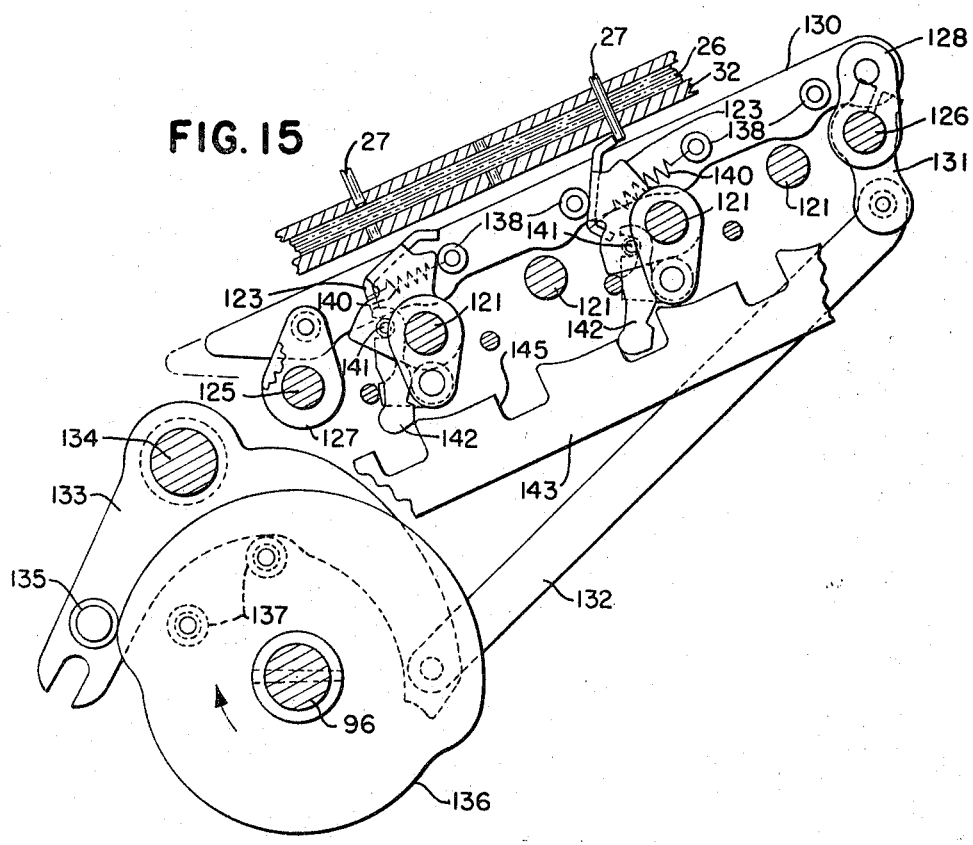
Figure 16:
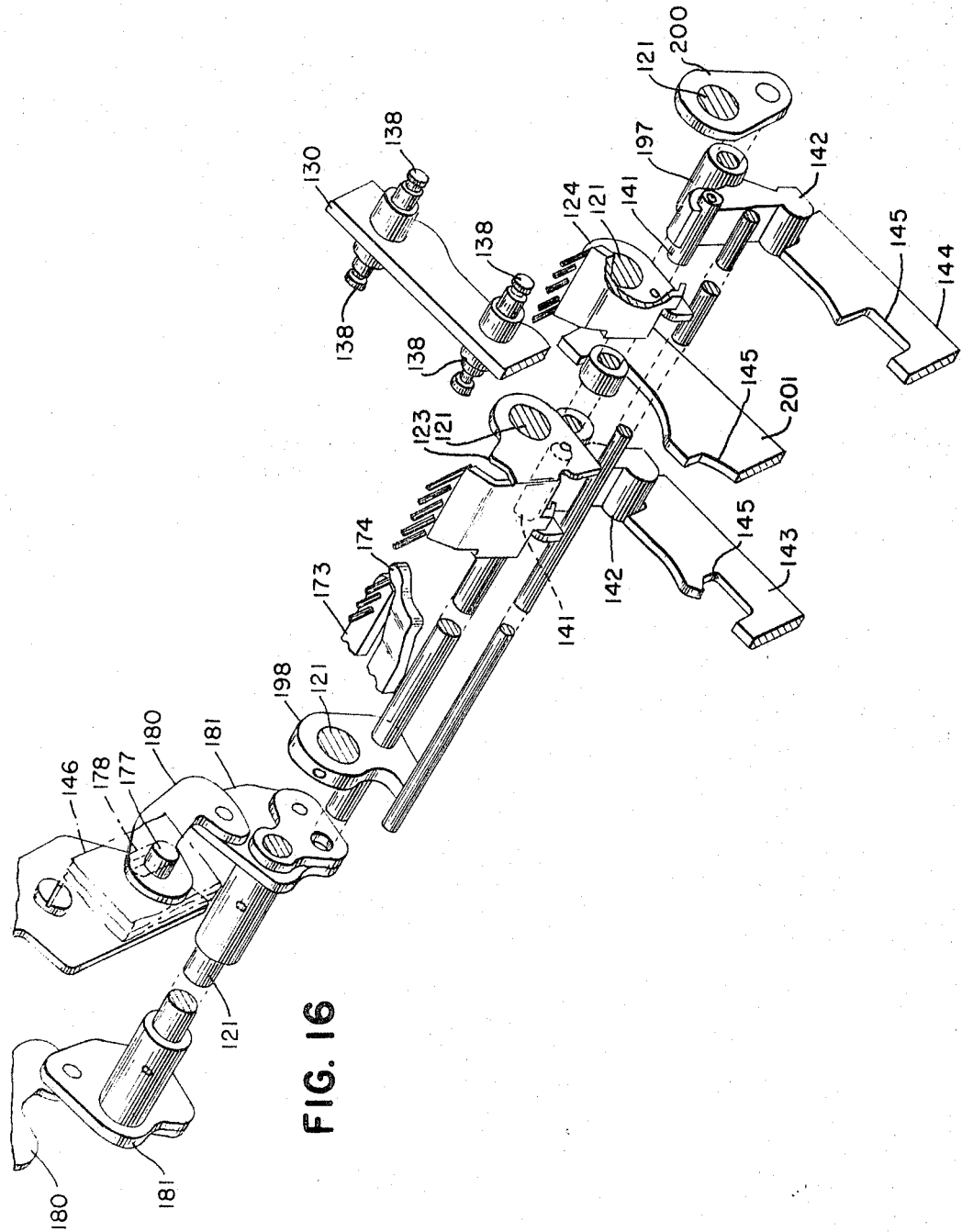
Figure 17:
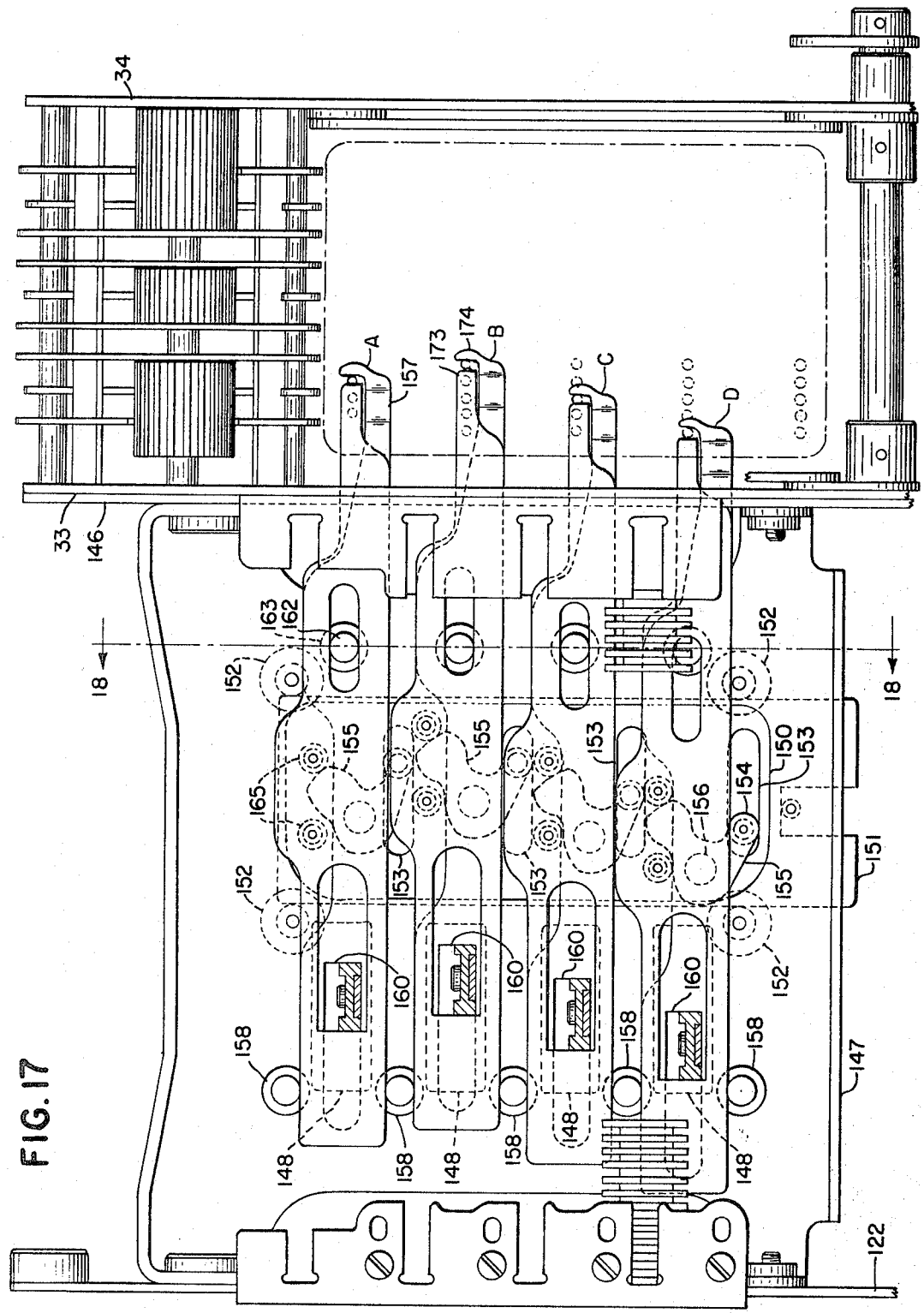
Figure 18:
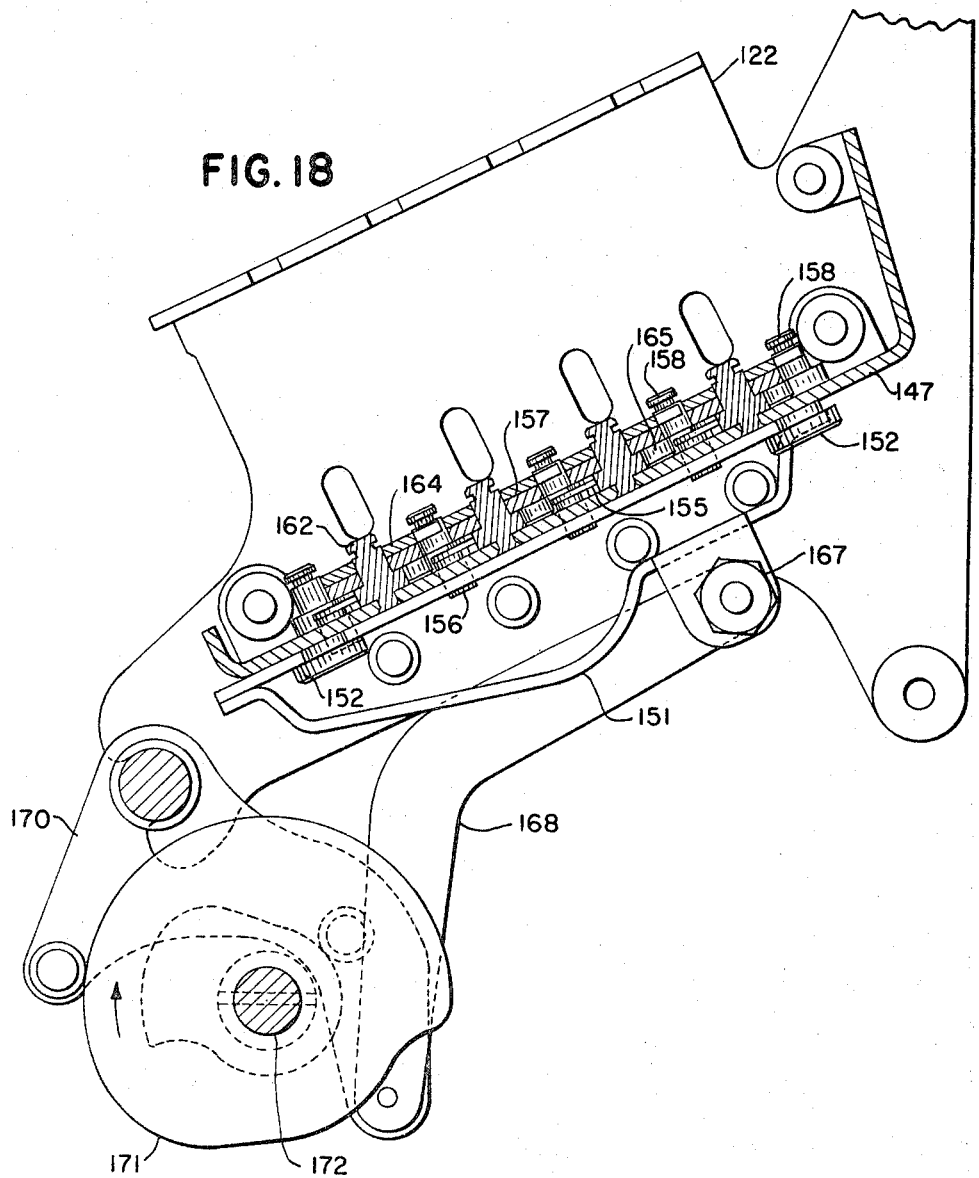
Figure 21:
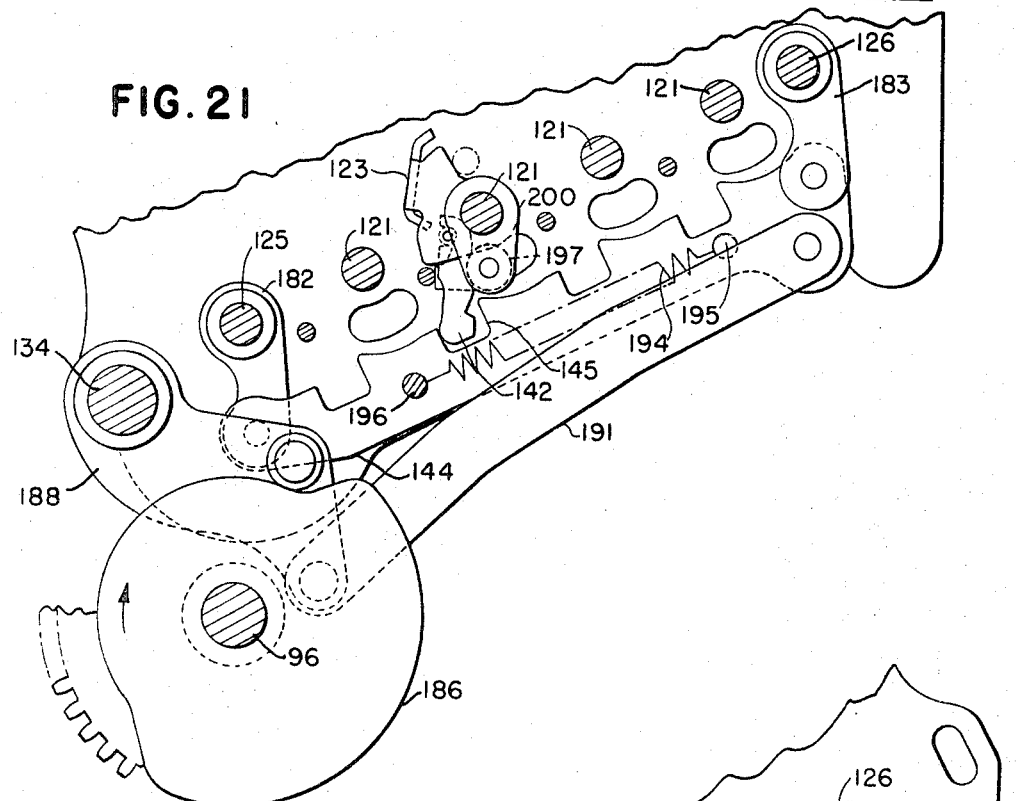
Figure 22:
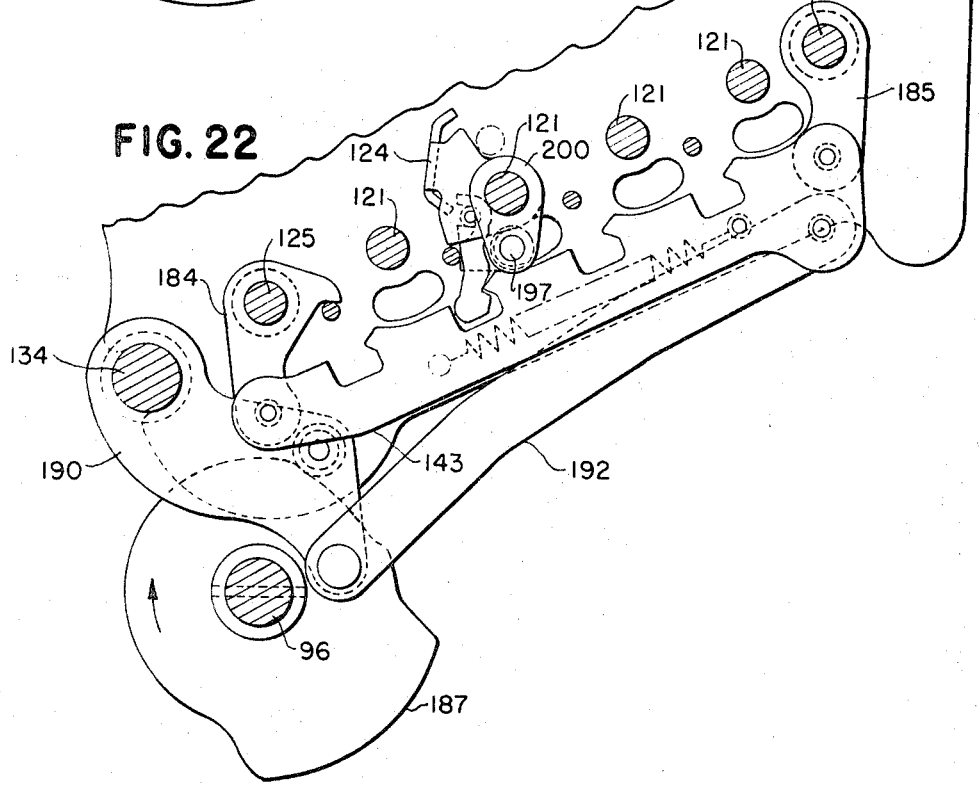
Figure 23:
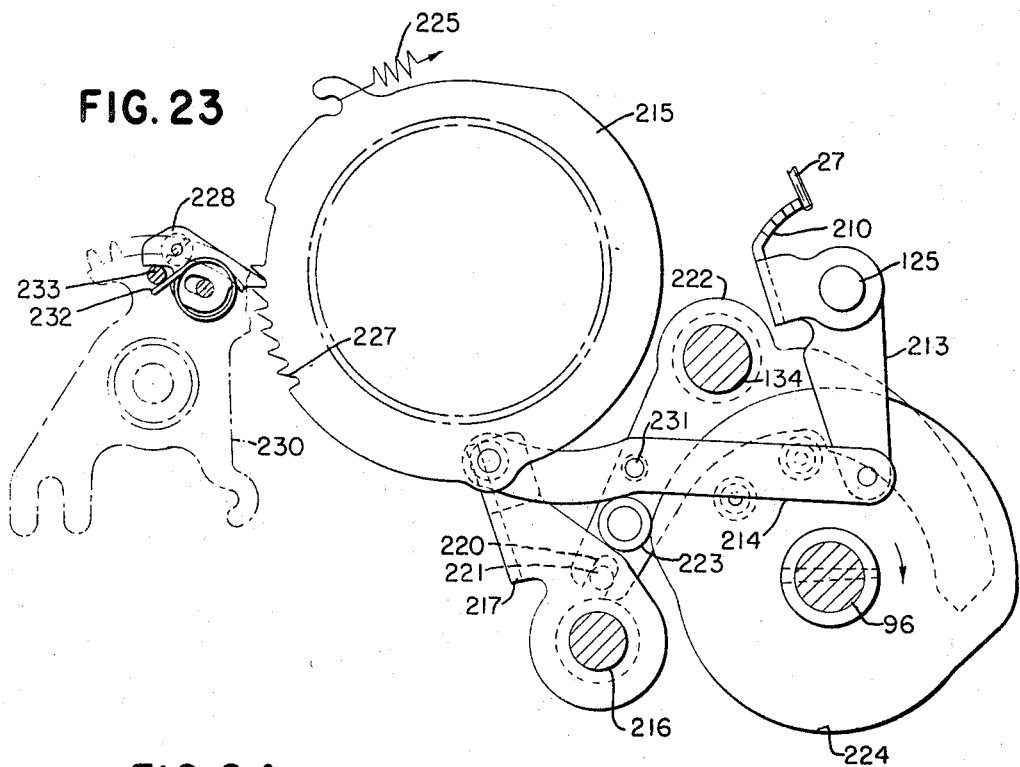
Figure 24:
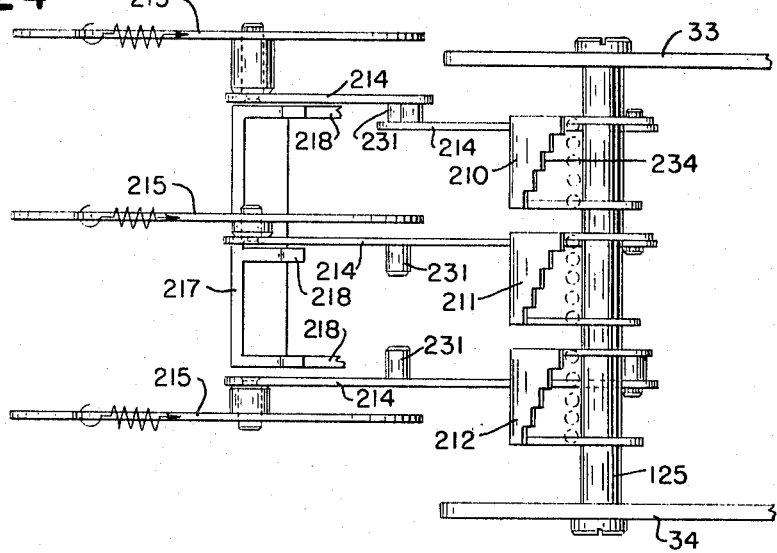

In said drawings:
FIG. 1 discloses a plan view of the keyboard of the present invention.
FIG. 2 is a front partial detailed view of the totalizer assembly.
FIG. 3 shows a detailed view of the totalizer engaging mechanism.
FIG. 4 is a rear view of the matrix rack positioning mechanism.
FIG. 5 is a sectional detailed view of the matrix positioning racks in the home position.
FIG. 6 is a sectional detailed view of the matrix positioning racks in the fully extended position.
FIG. 7 is a sectional detailed view of the first matrix positioning rack in the neutral position.
FIG. 8 is a sectional detailed view of the second matrix positioning rack in its home position.
FIG. 9 is a partial detailed top view of the pin cage assembly and the matrix liner plate control mechanism.
FIG. 10 is a sectional detailed view taken on the line 10—10 of FIG. 9.
FIG. 11 is a sectional detailed view taken on the line 11—11 of FIG. 9.
FIG. 12 is a side sectional detailed view of the pin cage assembly and the matrix liner plate drive mechanism.
FIG. 13 is a sectional detailed view of the drive mechanism for the matrix plate liner.
FIG. 14 is a top detailed view of the matrix plate assembly.
FIG. 15 is a detailed side view of the reset totalizer selection control mechanism.
FIG. 16 is a partial detailed perspective view of one of the totalizer engaging shafts.
FIG. 17 is a top detailed view of the totalizer shifting mechanism.
FIG. 18 is a sectional detailed view of the totalizer shifting mechanism taken on the line 18—18 of FIG. 17.
FIG. 19 is a partial detailed view of the totalizer shifting slides showing the slides in the fully engaged positions.
FIG. 20 is a partial detailed view of the totalizer disengaging mechanism.
FIG. 21 is a detailed view of the add engaging totalizer mechanism.
FIG. 22 is a detailed view of the reset engaging totalizer mechanism.
FIG. 23 is a partial detailed side view of the printer control feeler mechanism.
FIG. 24 is a partial detailed top view of the printer control feeler mechanism.

The invention disclosed herein is adapted for use in a machine of the type illustrated and described in United States Patent No. 2,616,623, issued Nov. 4, 1952, on the application of Mayo A. Goodbar et al., and in United States Patent No. 1,865,147, issued to Bernis M. Shipley on June 28, 1932, in which the selection of totalizers and printer mechanisms is controlled by transaction keys mounted on the keyboard. Since the invention is limited to the selection and shifting of the totalizers and the selection of the printer mechanisms, only those elements which are required for a full understanding of the invention will be disclosed and described herein.

Referring now to FIG. 1, there is shown a schematic representation of the keyboard of the cash register in which the present invention is utilized. Included in the keyboard are three rows of nine transaction keys 21 each, five rows of amount keys 22, two rows of print keys 23, and a special "No Received" key 24. As is well known in the art, the keys in three transaction rows control the operation of the machine which includes the selection of the totalizer into which are inserted amounts set up on the amount keys and the operation of the printing mechanism. As is fully disclosed in the above-cited Goodbar et al. United States patent, the depression of certain keys in the transaction rows will result in the operation of the machine. Each transaction bank has mounted adjacent the stem of each key in that bank primary and secondary rack members. Upon initiation of a machine operation, which consists of the actuation of several lines of cam members, the primary rack member will be positioned by engaging the stem of the depressed key in that bank. This positions the primary rack commensurate with the key depressed. Subsequent operation of the machine will position the secondary rack according to the position of the primary rack. Thus the secondary rack is positioned commersurate with the key depressed. Further operation of the machine will move the primary racks back to their home positions, but the secondary racks will remain in the adjusted positions until the next machine operation occurs. The function of the secondary rack members is to control which totalizer lines are to be brought into engagement with the differential rack members of the amount banks, so that the setting of the amount racks will add into the engaged totalizer the amount represented by the keys depressed in the amount banks.

Referring now to FIG. 2, there is shown a partial detailed view of the totalizer mechanism assembly used in the present invention. Included in this mechanism are four lines of totalizers represented as 25, six matrix plates 26 containing a predetermined number of holes, each plate being settable under the control of a secondary rack member of one of the transaction banks of keys 21, and a plurality of pin members 27, which are used in sensing the holes in the matrix plates for controlling the shifting and engaging of the totalizer lines 25 and for controlling the operation of the various printing mechanisms contained in the cash register.

In FIG. 14 is shown a top view of the matrix plates used in this embodiment. There are two matrix plates for each transaction bank. One plate is positioned for selection as the secondary rack member of the transaction bank moves under the control of the transaction keys in positions 1 to 5, while the other matrix plate for the same transaction bank is positioned for selection as the secondary rack member of the transaction bank is controlled by the transaction keys in positions 5 through 10. Only one matrix plate is effective in any one given operation.

Each matrix plate is divided into fifteen control areas. As indicated in FIG. 14, the plate is divided into five selecting divisions, with the letters A, B, C, and D representing, respectively, the four totalizer lines A to D inclusive (FIG. 17), while P represents the print and feed selection of the printers. Each selection division is divided into three zones 1, 2, and 3. Zone 1 controls the shifting of each of the respective totalizer lines, while in the printer division, zone 1 controls the selection of a print and feed for the journal printer. Zone 2 controls the engaging of each of the totalizer lines with the secondary racks of the amount banks in reset timing, while in the printer division, zone 2 controls the selection of the feed and print operation of the slip printer. Zone 3 will select each of the totalizer lines in add timing, while in the printer division, this area will control the feed and print operation of the receipt printer.

Each of the control areas on the matrix plates contains thirty large holes 28 and small holes 29 (FIG. 14) in six rows of five holes each. One of the six rows of holes is a neutral row consisting of all large holes 30. These rows as viewed in FIG. 14 would be in a vertical direction. Positioned adjacent each of the control areas and running in both a vertical direction and a horizontal direction are rows of raised dimples 39, which function to provide a slight clearance between each adjacent matrix plate to break the surface tension of the oil that is used with the matrix plates. This allows the plates to slide easily with relation to each other.

As set out above, each secondary transaction rack member of each transaction row will control two matrix plates. The only difference between each of the two plates is the position of the neutral row of large holes 30 (FIG. 14). As shown in FIG. 14, the top matrix plate 26 has these holes in the sixth vertical row from the right edge of the plate and every seventh vertical row after that. The other associated matrix plate 31 has this row as its first vertical row and every seventh vertical row after that. These rows of large holes function to allow the sensing pins to protrude through the plate to sense other plates in a manner to be described hereinafter.

Referring now to FIGS. 4 to 8 inclusive, there are shown various views of the matrix rack mechanisms for positioning the matrix plates in accordance with the transaction key depressed on the keyboard. FIG. 4 is a rear view of the matrix rack mechanism showing the six matrix plates 26 mounted between two guides plates 32 (FIG. 2), which in turn are mounted between two side frames 33, 34 of the totalizer mechanism assembly. Mounted between the side frames 33, 34 is a shaft 35, which rotatably supports three pinion drive gears 36, 37, and 38. The pinion gear 36 engages the secondary transaction rack 40 (FIGS. 4 to 8 inclusive) of the first transaction bank, the gear 37 engages the secondary rack member 41 (FIG. 4) of the second transaction bank, and the gear 38 engages the secondary rack member 42 of the third transaction bank. Since the matrix-positioning mechanism of each of the transaction banks is the same, only the operation of the matrix-positioning mechanism of the first transaction bank will be described.

Referring now to FIGS. 5 to 8 inclusive, there is shown a partial detailed view of the secondary rack member 40 of the first transaction bank positioning its associated matrix plates. The pinion teeth 43 of the gear 36 engage a pair of matrix rack members 44, 45 (FIGS. 4 and 8), which are mounted for horizontal movement by means of a pair of studs 46, which slide in a notch 47 (FIG. 8) located in a pair of support plates 48, which in turn are secured to a shaft 50 (FIG. 8) extending between the side frames 33, 34. A divided guide plate 51 (FIG. 4), also mounted on the shaft 50 and positioned between the rack members 44, 45, supports the studs 46 of the adjacent rack members 44, 45 for horizontal movement. Each of the rack members 44, 45 has a matrix plate stud 52, which extends down into a slot 53 (FIG. 14) located in its associated matrix plate. As shown in FIG. 7, the rack member 44 engages the matrix plate 54, so as to move the plate to a position representing any of the first to the fifth positions of the secondary rack member 40. The rack member 45 (FIG. 8) engages the matrix plate 55 by means of the stud 52, so as to move the plate to a position representing any of the sixth to the tenth positions of the secondary rack member.

Each of the matrix rack members 44, 45 has a curved extension 56, 57 (FIGS. 4, 7, and 8) respectively adjacent the teeth 58 (FIGS. 4, 7, and 8) of the racks. These extensions cooperate with the pinion gears 36 to allow the gear to drive both matrix rack members 44, 45 intermittently in a manner which will now be described.

As disclosed fully in the previously cited Goodbar et al. United States patent, the primary transaction racks are moved from their home position to a position commensurate with the transaction key depressed in that bank. The secondary transaction rack members are then moved and positioned according to the position of the primary rack, after which the primary rack is then returned to its home position. Thus the secondary rack is positioned in its adjusted position at the end of the machine operation and will move from this position to its next adjusted position during the next machine operation. Referring to FIG. 5, the secondary rack member is shown in the first position. The first transaction key at the bottom of each of the transaction rows of keys, as shown in FIG. 1, represents the first position of that transaction row. Thus any key depressed in a transaction row will move its secondary rack member 40 between the first and ninth positions. If no key is depressed in the row, the rack member will move to its tenth position.

In FIG. 5, the matrix rack members 44, 45 are shown in the first position. This corresponds to a control position for the rack member 44 and a neutral position for the rack member 45. When a rack member is in a neutral position, the neutral rows of large holes 30 (FIG. 14) of its associated matrix plates will be in alignment with the sensing pins, thus allowing the sensing pins to move through the particular matrix plates that are in the neutral position. This in effect allows those matrix plates which have been adjusted and are in a control position to control the selection of the machine operation. In the present example, the matrix plate 54, operated by the rack member 44, would control the machine operation. Assuming that secondary rack member 40 is adjusted for movement to its tenth position, this movement will move the secondary rack member 40 to the left, as viewed in FIGS. 5 to 8 inclusive, resulting in the counter-clockwise rotation of the pinion gear 36. The gear 36 contains a pair of cut-out portions 60, 61, each of which is in alignment with one of the curved extensions 56, 57 respectively the matrix rack members 44, 45. The cut-out portion 60 is associated with the matrix rack member 44, while the cut-out portion 61 is associated with the rack member 45.

As the gear 36 starts its counter-clockwise movement under the control of the secondary rack member 40 a large pinion tooth 62 and the smaller pinion teeth 43 will move the matrix rack members 44 to the right, as viewed in FIG. 5, to a position which corresponds to the fifth position of the secondary transaction rack member 40. The cut-out portion 60 will accommodate the curved extension 56 of the rack member 44 during this movement. When the transaction rack member 40 goes from the fifth position to the sixth position, the rack member 44 will be moved to the sixth position (FIG. 7), which is the neutral position for this rack. At this time, the rack member 44 will run out of mesh with the pinion teeth 43 (FIG. 7) of the gear 36. While the rack member 44 has been moving towards its fifth position, the pinion teeth 43 of the gear 36 have engaged the curved extension 57 of the rack member 45, thus holding the rack member in its first, or neutral, position. As the gear 36 drives the rack member 44 to the sixth position (FIG. 7), a large pinion tooth 63 and the regular pinion teeth 43 (FIG. 8) of the gear 36 engage the rack member 45 and drive the rack member to its tenth position (FIG. 6). During this movement, the cut-out portion 61 accommodates the curved extension 57 of this rack member.

While the rack member 45 is being moved to the tenth position by the secondary transaction rack member 40, the pinion teeth 43, 62 of the gear 36 engage the curved extension 56 of the rack member 44 (FIG. 7), thus holding the rack member in the position shown. From this construction, it will be seen that any transaction key depressed in a transaction row of the keyboard will position one of the maxrix plates 26 in a control position, while the other matrix plate for that transaction bank will be in a neutral position. As will be described more fully hereinafter, sensing pins will then be actuated to sense the adjusted matrix plates. Those sensing pins which are moved through all of the matrix plates will control the operation of the machine.

Each of the matrix plates 26 (FIG. 14) will have, punched in a predetermined design, large holes throughout each of the control areas, depending on what function is to be controlled by the transaction keys. The selection of the functional control depends on a sensing pin passing through an aligned large hole 28 (FIG. 14) in each of the six matrix plates. It will be readily apparent that, by merely changing the matrix plates, the functional control of the machine operation—that is, what totalizers are to be selected by what transaction keys and the operations of the various printers—can be changed. It is also obvious that the number of totalizer lines is not limited by the number of transaction keys contained in the machine. Because of the infinite number of arrangements that can be made by the programming of the location of the large holes of the matrix plates, computers are used to provide programmed control tapes which control punching machines to punch the large holes in the matrix plates.

Referring now to FIGS. 9, 10, and 11, there are shown details of the pin cage assembly which supports the sensing pins used to sense the matrix plates. The pin cage assembly consists of a top plate 64 (FIG. 11) and a bottom plate 65, having U-shaped side portions 66. Studs 67, mounted on each side portion 66, are positioned in cam slots 68 (FIG. 12) located in the cage drive links 70. Six screws 71 interconnect the top and bottom plates 64, 65 and hold them together. Each of the plates contains five rows of apertures 72 (FIG. 9), through which the sensing pins 27 (FIG. 11) are positioned. Each of the pins 27 has a shoulder portion 74, which engages one end of a compression spring 75, the other end of which engages the top plate 64. Mounted between the plates 64, 65 are a pair of liner pin drive bars 76 (FIGS. 9 and 10) connected by two inner shafts 77 and two outer shafts 78 (FIG. 9). Secured to each outer shaft is a lever in a liner pin 80 (FIGS. 9 and 10), which extends through the matrix plates 26.

The liner pins 80 are so positioned as to extend through one of the large holes 30 in the horizontal row separating zone 1 from zone 2 of the matrix plates (FIG. 14). The function of the liner pins 80 is to assure that the matrix plates are in alignment prior to a sensing operation by the sensing pins. Located on each liner pin drive bar 76 is a stud 81, which extends through the side portion 66 of the bottom plate 65 of the pin carriage and a cam slot 82 (FIG. 12) located in each of the cage drive links 70. As will be described more fully hereinafter, rectilinear movement of the drive links 70 moves the pin cage assembly in a direction perpendicular to the face of the matrix plates to allow the sensing pins to sense the holes in the plates.

Mounted on the upper plates 32 are two guide screws 83 (FIGS. 9 and 11), which guide the pin cage assembly during a sensing operation. As shown in FIG. 9, rotatably mounted between the side frames 33, 34 (FIGS. 2, 9 and 12) are a pair of shafts 84, 85. Pinned to the shaft 84 are a pair of drive arms 86 (FIG. 12). Each drive arm 86 rotatably engages one end of a cage drive link 70 positioned on each side of the pin carriage. The other end of the drive link 70 engages an idler arm 87 (FIGS. 9 and 12) rotatably mounted to the side frames 33, 34. Also pinned to the shaft 84 is a second drive arm 88 (FIG. 12), which engages one end of a drive line 90, the other end of which is rotatably mounted on a cage drive cam arm 91.

The cam arm 91 is rotatably supported on a stud 92 secured to a side frame member of the machine. Mounted on the other end of the cam arm 91 are a pair of rollers 93, 94, which engage the cam race of the cam drive arm of a cage drive cam 95 secured to the transaction cam line 96. As shown in FIG. 12, both the cam 95 and the pin carriage assembly are shown in the home position. As the cam line 96 rotates clockwise during a machine operation, the high portion 97 of the cam engages the rollers 94, and the cam 95 first rocks the cam arm 91 and the shaft 84 counter-clockwise, thereby moving the cage drive link 70 up and to the right as viewed in FIG. 12. This positions the stud 67 of the pin carriage assembly in the lower left portion of the cam slot 68 located in the drive link 70. This is the fully restored position for the pin carriage assembly. At approximately 128 degrees of revolution of the cam line, the high portion 98 of the cam 95 engages the back roller 93, thereby rocking the cam arm 91 and the shaft 84 clockwise. This moves the drive link 70 down and to the left, as viewed in FIG. 12. As the studs 67 are cammed to the right in the cam slots 68, the pin carriage assembly is moved down to move the sensing pins through the matrix plates in a sensing operation. Those pins which sense the aligned large holes in each of the matrix plates will penetrate the plates, while those sensing a small hole in one of the plates will stop. When a sensing pin stops, due to sensing of a small hole, the pin cage assembly continues its downward movement. This movement forces the shoulder portion 74 of the stopped sensing pin to compress the compression spring 75 against the top plate 64 of the pin cage assembly.

The pin cage assembly will stay in this down position until both rollers 93, 94 move to the position shown in FIG. 12. This results in the slight counter-clockwise rotation of the cam arm 91 and the shaft 84, allowing the drive links to move to the right, thereby positioning the studs 67 as shown. As a result of this movement, the pin cage assembly moves up, thereby withdrawing the sensing pins out of the matrix plates. Those pins which have had their compression springs 75 compressed will be returned to their normal position by the springs 75. This movement frees the matrix plates of the sensing pins by the end of the transaction cam line cycle of operation.

Prior to the time that the pin cage assembly is moved in a downward sensing operation the pin cage assembly is locked in its fully restored position to prevent the possibility of a sensing pin 27 (FIG. 11) or liner pin 80 (FIGS. 9 and 10) from interfering with the positioning of the matrix plates 26 by the matrix rack members 44, 45 (FIGS. 5 to 8 inclusive) in a manner described previously. Also prior to the downward sensing movement of the pin carriage assembly, a matrix liner plate 100 (FIGS. 9 and 12) is raised to engage the matrix plate studs 52 (FIGS. 4, 5, 6, 7, 8, and 12) to pre-align the matrix plate 26. The mechanism for controlling these operations will now be described.

Referring to FIGS. 12 and 13, there is shown secured to the transaction cam line 96 the cam gear 101, containing three studs 102. Associated with the cam gear 101 is a control arm 103, pinned to the shaft 84 and having one end engaging a drive link 104. The other end of the link 104 engages a drive arm 105 (FIGS. 9 and 12) pinned to the shaft 85. Mounted on the outside of the arm 105 is a stud 106, to which is connected one end of a spring 107, the other end of which is connected to a stud (not shown) mounted to the side frame 34. A second stud 108 (FIG. 9), mounted to the other side of the arm 105, is positioned within a slot 110 of one of a pair of cage-restoring links 111 (FIG. 9) each positioned adjacent the cage drive link 70 (FIG. 11). The other cage-restoring link 111 is shown in FIG. 10. The link is engaged by a drive arm 113 pinned to the shaft 85. Upon operation of the transaction cam line 96, the studs 102 on the cam gear 101 will engage the control arms 103 and rock them counter-clockwise, which movement is transmitted by the drive link 104 and the drive arm 105 to the shaft 85.

Rotation of the shaft 85 moves the two cage-restoring links 111 (FIGS. 9 and 10) to the right, against the action of the spring 107. As viewed in FIG. 10, this movement of the restoring links 111 allows a locking portion 114 of each link to move under the stud 67 (FIGS. 9, 11, and 12) of the pin cage assembly. At this time, the pin cage assembly is in the fully restored position; that is, the stud 67 is in the left-hand portion of the slot 68. Thus the pin carriage is locked in its fully restored position.

Also mounted on the drive arms 105 (FIG. 12) and 113 (FIG. 10) are a pair of matrix plate liner arms 115, 116, supporting the matrix liner plate 100, which consist of a series of slots 117. Each of the arms 115, 116 contains a shaft 118 (FIG. 12) extending through a slot 120 in the side frame 33, 34 for guiding the movement of the liner arms 115, 116. Upon the counter-clockwise rotation of the shaft 85 in the manner described above, the liner arms 115, 116 will lower the liner plate 100, thereby disengaging the matrix plate studs 52 (FIG. 1) from the slots 117 of the liner plate 100. This allows the matrix plates 26 (FIG. 10) and the studs 52 to be freed for positioning by the action of the secondary transaction rack member 40 in the manner described previously.

As the third stud 102 (FIG. 13) of the cam gear 101 moves under the back portion of the control arm 103, the spring 107 rocks the shaft 85 clockwise, resulting in both cage restoring links 111 (FIGS. 9 and 11) unlocking the pin cage assembly. This movement also brings the matrix liner plate 100 (FIG. 12) into engagement with the matrix plate studs 52, thus locking and aligning the adjusted matrix plates 26.

Before the matrix plates 26 (FIG. 10) can be positioned on any operation, the two liner pins 80 must be moved out of engagement with the matrix plates. The liner pins 80 are moved up at the end of the previous machine operation. As previously described, the cam 95 drives the cage drive links 70 to the right and up, as viewed in FIG. 12. This movement allows the cam slots 82 located in the drive link to cam the studs 81 (FIGS. 9 and 10) and their associated drive bars 76 upwardly, which moves each of the liner pins 80 out of engagement with the matrix plates 26. The matrix plates are now free to be positioned. As the cam 95 continues its rotation, the drive arm 91 is rocked clockwise, resulting in the drive links being moved down and to the left, as viewed in FIG. 12. This movement allows the cam slots 82 to cam the stud 81 and the drive bar assembly downward, allowing the liner pins 80 to again move through the liner holes 30 (FIG. 14) in the now-adjusted matrix plates.

As described previously, the cash register of the present invention has a capacity of twenty totals, five totals in each of the four totalizer lines 25 (FIG. 2). Each total has an accumulating capacity of 999,999.99. A total not used as a storage total is called an itemizer, and any of the four totalizer lines may contain an itemizer. When an add and substract itemizer, often called a crossfooter, is used, it can be used only in the first, or A, totalizer line (FIG. 17). The totalizer lines are brought into engagement with the rack members of each amount bank during an add, read, or reset operation of the machine. Reference should be made to the previously-cited Goodbar et al. United States patent for a full disclosure of the various types of machine operations and of the construction of the various types of totalizers.

As described previously with regard to the matrix plates 26 (FIG. 14), various areas of each matrix plate control the selection, shifting, and engagement of each totalizer line. Thus the keyboard is no longer in direct control of the totalizer function. There are two separate sets of totalizer selecting controls in the machine. One set of controls selects its associated totalizer line for engaging the amount racks during a reset operation of the machine, while the other set of controls selects a totalizer line for engagement with the amount racks during an add operation of the machine. The selection of a totalizer line for a read operation of the machine is under the control of both of the add and reset selecting controls.

As shown in FIG. 2, rotatably supported between the side frames 122, 34 of the machine are four totalizer engaging shafts 121, each of which rotatably supports a pair of totalizer control feelers 123, 124, positioned adjacent zones 2 and 3 of the matrix plates 26 (FIG. 14). The control feelers 123 of each totalizer shaft will rotate the shaft in add timing, while the control feeler 124 will rotate the shaft in reset timing. Reference should be made to FIG. 16, which shows a detailed perspective view of one of the totalizer engaging shafts 121 with its associated control feelers. As disclosed previously, zones 2 and 3 of the matrix plates (FIG. 14) control the reset and add selecting controls, respectively. As will be described more fully hereinafter, each control feeler will sense the sensing pins in one of the zones of the matrix plates. Since there is one shaft 121 for each line of totalizers, and the function of each of the control feelers on each shaft is the same, only a description of the operation of a reset control feeler on one of the shafts 121 will be given.

Referring now to FIG. 15, there is shown a detailed view of the reset totalizer selecting control mechanism. Mounted on a pair of shafts 125, 126, positioned between the side frames 33, 34, are a restoring link arm 127 and a feeler restoring link arm 128, each of which rotatably supports a feeler restoring link 130 (FIG. 16) positioned adjacent the bottom of the matrix guide plates 32. Pinned to the shaft 126 is a drive arm 131, which engages one end of a drive link 132, having its other end mounted on a cam arm 133. The cam arm 133 is rotatably mounted on a shaft 134, supported between the machine frames. The cam arm 133 has a roller 135, which coacts with a drive cam 136 pinned to the transaction cam line 96. Upon the clockwise rotation of the transaction cam line 96, a pair of rollers 137, mounted on the back of the cam 136, engage and rock the cam arm 133 counter-clockwise. This movement is transmitted by the drive link 132 to the shaft 126, thereby rocking the shaft counter-clockwise. This results in the restoring link 130 being moved to the left, as viewed in FIG. 15. The restoring link 130 has, mounted on both of its sides, four studs 138. This arrangement is better shown in FIG. 16. Each stud 138 is positioned adjacent one of the control feelers 123, 124. A spring 140 is mounted between each of the control feelers and its associated stud 138, and functions to rotate the control feelers clockwise against the studs 138, thus holding the feeler against the stud. Upon movement of the restoring link 130 to the left, the stud 138 will rotate the control feelers counter-clockwise. Each of the control feelers 123, 124 has rotatably mounted thereon, by means of a stud 141, a totalizer engaging control arm 142 (FIGS. 2, 15, and 16). Located below each of the control arms 142 are a reset engaging link 143 (FIGS. 2, 15, and 16) and an add engaging link 144 (FIGS. 2 and 16), each having four notches 145, one for each totalizer engaging control arm 142 of each of the totalizer lines. Upon the counter-clockwise rotation of the control feelers 123, as described above, the associated control arms 142 are lowered into the notches 145 of the engaging links 143, 144.

After this operation has occurred, the pin cage assembly and the sensing pins 27 (FIG. 11) move down to allow the sensing pins to sense the matrix plates 26 in the manner described previously. If there is to be a machine operation in which certain totalizer lines are to be selected, in either add, read, or reset, predetermined sensing pins will protrude through the bottom matrix guide plate 32, as shown in FIG. 15. These pins will be positioned in one or both of zones 2 and 3 (FIG. 14) of the matrix plates in the area representing the totalizer line that is to be actuated.

After the sensing operation is completed, continued rotation of the cam 136 rocks the cam arm 133 clockwise, resulting in the restoring link 130 being moved to the right, as viewed in FIG. 5. It will be seen that, during this movement, any of the control feelers 123, 124 which senses a sensing pin 27 will be stopped, thereby allowing its associated totalizer engaging control arm 142 to remain in the notch 145 of the particular engaging link 143, 144. As the restoring link 143 continues its restoring movement, those feelers which have engaged a sensing pin will have their springs 140 stretched, while those which do not engage a sensing pin will be rocked clockwise by the springs 140, thereby withdrawing the associated control arm 142 from the notches 145 of the engaging link. Thus it will be seen that, depending on the transaction key depressed on the keyboard, certain of the totalizer lines 125 will have been selected for engaging the amount racks in either add, read, or reset timing.

After a particular totalizer line has been selected, the totalizer line is then shifted either left or right to one of five positions to align a particular set of totalizer wheels with the secondary racks of the amount banks. This operation will thus result in the selection of the particular totalizer as determined by the transaction key that is depressed on the keyboard. Reference should be made to the previously cited Goodbar et al. United States patent for complete disclosure of this operation. The selection of the totalizer lines and the position to which they are shifted are determined by a sensing pin in zone 1 of the matrix plates 26 (FIG. 14). Referring now to FIG. 17, there is shown a top detailed view of the totalizer shifting mechanisms. Since the shifting mechanism for each totalizer line is the same, only one shifting mechanism will be described in detail.

As shown in FIGS. 2, 17, and 18, mounted between the side frames 122 and a totalizer side frame 146, which is secured to the side frame 33 of the machine, is a shifting guide plate 147, containing four slots 148 (FIG. 17) on one side of the plate and a large oblong opening 150 on the other side. Mounted for rectilinear movement below the opening 150 in the guide plate is a shifting yoke 151 (FIGS. 17 and 19) supported by four studs 152 mounted on the guide plate 147. The yoke 151 contains four parallel slots 153, into each of which is positioned a depending stud 154 mounted on one segmental portion of a totalizer-shifting cam 155. Each cam 155 is rotatably mounted on a stud 156, which is secured to a lower shifting slide 157 (FIGS. 17, 18 and 19), which in turn is mounted for rectilinear movement by being slidably supported by a pair of studs 158 mounted on the guide plate 147. Contained in the lower slide 157 are a pair of slots 160, 161. The slot 161 (FIG. 19) contains a stud 162, which is located in the slot 163 of an upper slide 164, to which is mounted a pair of studs 165. The studs 165 are positioned adjacent the cam surface of the totalizer-shifting cam 155 mounted on its associated lower slide. The upper slide 164 also contains a slot 166, which coacts with the slot 160 of the lower slide in a manner to be described hereinafter. As shown in FIG. 17, the slides of the totalizer lines A to D inclusive are so designated.

As shown in FIG. 8, mounted to a stud 167 on the shifting yoke 151 is a drive link 168, which engages one end of a cam arm 170. The cam arm 170 engages a cam 171 mounted on the amount cam drive shaft 172. As the cam shaft 172 rotates clockwise at the beginning of its operation, the cam 171 rocks the cam arm 170 counter-clockwise, which movement is transmitted by the drive link 168 to the shifting yoke 151, moving the yoke to the right, as viewed in FIG. 18. This movement of the yoke allows the slots 153, contained in the yoke, to cam the studs 154 (FIG. 19) and each of the shifting cams 155 counter-clockwise from a position shown in FIG. 17 to the position shown in FIG. 19. The counter-clockwise movement of the cam 155 allows the cam to drive against one of the studs 165 of the upper slide 164, moving the slide to the left, as viewed in FIG. 19. This movement also moves the lower slide 157 to the right after the upper slide has reached the end of its movement. The movement of both slides continues until the stud 162 reaches the end of the slot 163 in the upper slide and the slot 161 in the lower slide. This condition is seen in FIG. 19. As shown, the right end portions 173, 174 of both the lower and upper slides straddle the area of zone 1 of the matrix plate 26 (FIG. 14) when in a restored position. At this time, the pin carriage and the sensing pins 27 (FIG. 11) will have been actuated to sense the matrix plates. Depending on what transaction key was depressed, one of the sensing pins will protrude through the matrix plates. After this has occurred, the cam 171 (FIG. 18) will rock the cam arm 170 clockwise, thus moving the shifting yoke 151 to the left, as viewed in FIG. 18.

Movement of the shifting yoke 151 to the left will result in the clockwise rotation of the shifting cams 155

(FIG. 19) about the stud 156, resulting in the upper segmental portion 159 of the cam camming the right-hand stud 165 and the upper slide 164 to the right until the end portion 173 of the slide engages a protruding sensing pin. This stops the movement of the slide 164. Further clockwise movement of the cam 155 after this engagement will be transferred to the lower slide 157, since the lower portion of the cam 155 will start to rotate about the upper portion 159 in a clockwise direction, thus moving the slide 157 to the left until its right end portion 174 engages the protruding sensing pin. Thus it will be seen from this scissors action that both slides of each totalizer line will be adjusted, depending on the position of the sensing pin that protrudes through the matrix plates. This condition is seen in FIG. 17.

Positioned within the slots 160, 166 of the upper 164 and lower 157 slides, respectively, of each totalizer line is the stem portion 175 (FIGS. 2, 3, 17, and 19) of a totalizer support member 176, which supports a line of totalizer wheels 193. The support member 176 is slidably mounted on a shaft 177 positioned in a slot 178 (FIGS. 3 and 16) located in the side frame members 122 and 146. It is seen from FIG. 17 that, as the slides 157, 164 are adjusted under the control of a protruding sensing pin in the matrix plates, as described above, the slots 160, 166 of both slides will engage the stem portion 175 and thus slide the support member 176 on the shaft 177 to a position commensurate with the position of the slides. Thus the totalizer lines will be shifted, depending on what pin is sensed in the matrix plate and thus the transaction key that is depressed on the keyboard.

After the totalizer lines 25 (FIG. 2) have been shifted to the proper position, the totalizers are moved upwardly to allow the aligned totalizers to engage the proper rack members in the amount banks. As disclosed above, each totalizer support member 176 is mounted on a shaft 177, which in turn is mounted within a slot 179 (FIGS. 3 and 16) in the side frames 122, 146. Secured to both ends of the shaft is an engaging link 180 (FIGS. 2, 3, and 15), which is rotatably mounted on an engaging arm 181, pinned to the totalizer engaging shafts 121. It will be seen from this construction that, upon the counter-clockwise rotation of the totalizer engaging shafts 121 (FIG. 16), the links 180 will raise the associated totalizer line 25, using the slot 178 as a guide. The totalizer engaging shaft 121 is rocked in either add or reset timing, in a manner which will now be described.

As was described previously with regard to the selecting (FIG. 15) of which totalizer line is to be engaged with the amount racks, the totalizer engaging control arms 142 of the selected totalizer line will have been positioned within a notch 145 of either or both of the add 144 (FIGS. 2 and 16) or reset 143 engaging links. Referring now to FIGS. 21 and 22, there is disclosed a drive mechanism for actuating each of the links 143, 144, which results in the rocking of the selected totalizer engaging shafts 121 to raise their associated totalizer lines into engagement with the amount racks.

The add engaging link 144 (FIG. 21) is rotatably supported by two engaging arms 182, 183, which in turn are rotatably supported on the shafts 125, 126. The reset engaging link 143 (FIG. 22) is similarly supported by the engaging arms 184, 185. Mounted on the transaction cam line 96 are the add engaging cam 186 (FIG. 21) and the reset engaging cam 187 (FIG. 22), engaging the cam arms 188, 190, which transmits the action of the cams by means of drive links 191, 192 to the add and reset engaging links 144, 143, respectively.

In an add operation, the rack members in the amount banks are positioned according to the amount indexed on the keyboard. After the rack members have been positioned, the selected totalizer line is engaged with the racks. As the amount racks are restored to their home position, the engaged totalizer pinions 193 (FIGS. 2 and 3) are rotated an amount commensurate with the key depressed. Thus the amount indexed on the keyboard is added to the amount already stored in the selected totalizer. Reference should be made to the previously cited Goodbar et al. United States patent for a complete disclosure of this operation. After the amount racks have been moved under the control of keys in the amount banks, the cam 186 will rotate the cam arm 188 counter-clockwise, moving the add engaging link 144 to the right, as viewed in FIG. 21. This movement is against the action of a spring 194, mounted between a stud 195 on the link 144 and a stud 196 on the side frame 33.

The movement of the add engaging link 144 to the right (FIG. 21) will rotate, in a counter-clockwise direction, any of the totalizer engaging control arms 142 that have been engaged by the notches 145 of the links. This movement of the control arms 142 will engage a shaft 197 (FIGS. 16 and 21), which extends between two arms 198, 200 (FIGS. 2, 16, and 21) and into engagement with the right-hand engaging arm 181 (FIGS. 2 and 16). The arms 181, 198, and 200 are pinned to the totalizer engaging shaft 121. Thus the counter-clockwise rotation of the control arm 142 is transmitted to the totalizer engaging shaft 121 by the shaft 197, which rocks the engaging arm 181 counter-clockwise, thus raising the selected totalizer line into engagement with the amount racks.

The operation of the reset cam 187 (FIG. 22) is the same as that of the add cam 186, just described, except that the cam moves the selected totalizer line into engagement with the amount racks before the racks are moved from their home position. After the selected totalizers have been engaged with the amount racks, the racks are moved under the control of the totalizers until a large tooth on the totalizer pinions engages a transfer mechanism, which stops the movement of the amount racks. Thus the amount racks are positioned commensurate with the amount contained in the totalizers. The totalizers at this point have been reset to zero. For a full disclosure of this operation, reference should be made to the previously cited Goodbar et al. and Shipley United States patents.

Referring now to FIG. 20, there is shown a detailed view of the totalizer disengaging mechanism. This mechanism includes a disengaging link 201 (FIGS. 2, 16, and 20) supported by a pair of arms 202, 203 rotatably mounted on the shafts 125, 126. A cam 204, pinned to the transmission cam line 96, moves the link 201 to the right, as viewed in FIG. 20, by means of a cam arm 205 and a drive link 206. This movement occurs at the beginning of the cam cycle. After the add engaging link 144 (FIG. 21) has moved the totalizer lines into engagement with the amount racks and the amount racks have been returned to their home position, the cam 204 rocks the cam arm 205 counter-clockwise, thus moving the link 201 to the left. This movement allows the notches 207 of the link 201 to engage and rock clockwise the shafts 197 of each totalizer line, as viewed in FIG. 20, which results in a clockwise rotation of the totalizer engaging shafts 121 (FIG. 3), thereby returning the selected totalizer lines 25 to their home position. At this point, the cam 204 again moves the link to the right, thereby releasing the shafts 197 for rotation, which allows the reset engaging link 143 (FIG. 22) to move the selected totalizer lines into engagement with the amount racks in reset timing. After the amount racks have been positioned according to the amounts set up in the totalizers, the cam 204 again moves the engaging link 201 to the left, as viewed in FIG. 20, thereby rocking the totalizer engaging shafts 121 clockwise, which returns the selected totalizer lines 25 to their home position.

Referring now to FIGS. 23 and 24, there are shown detailed views of the printer control used in the machine. As described previously with regard to the matrix plates 26 (FIG. 14), the lower division P of the matrix plate is directed to the control of the "Journal," "Receipt," and "Slip" printers. Rotatably mounted on the shaft 125, beneath the matrix plates 26 (FIG. 2) are three feeler members 210, 211, 212, which sense the control areas of the matrix plates for controlling the operation of the "Journal," "Slip," and "Receipt" printers, respectively. Each of the feeler members has a lower extension 213 (FIG. 23), to which is mounted a link 214, the other end of which is rotatably mounted to a printer feeler segment 215, which is part of a transmission line. Rotation of the segment 215 is transmitted by means of internal gears driving square rods to the appropriate printer mechanism in the machine. Reference should be made to the previously cited United States Patent No. 2,616,623, issued to Mayo A. Goodbar et al., for a complete description of the operation of the printer segments 215.

Rotatably mounted on a shaft 216, supported within the machine, is a feeler control yoke 217, having three feeler portions 218, each of which coacts with a stud 220 mounted on the links 214. Mounted on the side of the control yoke 217 is a stud 221, which is engaged by a slot 220 located on one end of a cam arm 222. The cam arm 222 is rotatably mounted on the shaft 134 and supports a cam roll 223, which coacts with a cam 224 secured to the transaction cam line 96.

The printer segment feeler 215 is normally biased to move clockwise by a spring 225, which engages a finger portion 226 of the feeler. The segment feeler 215 also contains a number of teeth 227, located on its peripheral edge, which coact with a feeler-retaining pawl 228 rotatably mounted on a support plate 230. At the beginning of a machine operation, the transaction cam line 96 rocks the cam 224 clockwise, resulting in the counter-clockwise movement of the cam arm 222 and the clockwise movement of the yoke 217.

The clockwise movement of the yoke 217 results in the engagement of the yoke's three finger portions 218 (FIG. 24) with the stud 231 mounted on each of the links 214. The movement of the yoke moves the links 214 to the right, as viewed in FIG. 23, thus rocking the feeler member 210 counter-clockwise. This movement continues until the feelers are moved to their home position. At the end of the previous machine operation, the feelers 210 were left in their adjusted position, thus requiring them to be returned to their home position prior to a new sensing operation.

The action of the yoke 217 on the links 214 will also result in the counter-clockwise rotation of the printer feeler segment 215 against the action of the spring 225. This rotation will also rotate the retaining pawl 228 clockwise against the action of a spring 232 mounted on the pawl and against a stud 233 located on the support plate 230. After this has occurred, a sensing pin operation will occur in the manner described previously. After those pins which have been programmed to protrude through the matrix plate in the control area for controlling the operation of the printer mechanism have been positioned, the cam roll 223 will engage the high portion of the cam 224, thus rocking the cam arm 222 clockwise. Prior to this operation, the support member 230 will have been rotated counter-clockwise, thus withdrawing the pawl 228 from engagement with the teeth 227 of the feeler segment 215. As the pawl is removed, the spring 232 rocks the pawl counter-clockwise until an end portion of the pawl engages the stud 233.

The clockwise rotation of the cam arm 222 releases the feeler segment 215 to the action of the spring 225 due to the counter-clockwise rotation of the yoke 217. Clockwise rotation of the segment 215 by the spring 225 will allow each of the feeler members 210 to sense one of the sensing pins 27 that have been positioned by the matrix plates. As shown in FIG. 24, each feeler member has five stepped feeler portions 234, one of which will engage a sensing pin. Thus, depending on the position of the sensing pin sensed, the feeler segment 215 will be rotated to one of six positions, the sixth position representing no pins sensed. As set out fully in the previously cited Goodbar et al. United States patent, the rotation of the feeler segment is transmitted by means of square rods and an internal pinion gear to one of the printer mechanisms, where, depending on the extent of rotation given to the feeler segment by the pin that has protruded through the matrix plate, the printer mechanism will be operated to print either a single or a double impression, to feed a receipt, etc.

After the feeler segments 215 have been set by their associated feeler members 210, the support plate 230 will be rocked clockwise, thus positioning the pawl 228 in one of the teeth 227, thus locking the feeler segment 215 in its adjacent position. This condition will exist until the beginning of the next machine operation, when the cam 224 will return each of the feeler members 210 to its home position, as set out above. Thus it will be seen that, by means of the positioning of the various matrix plates, the operation of the various printer mechanisms can be controlled.

What is claimed is:

1. In a business machine apparatus constructed and arranged to perform various types of machine operation and including a plurality of selectively depressible control keys, the combination including:
   (a) a first rack member actuated to a position commensurate with the control key depressed;
   (b) a second set of rack members settable to a position commensurate with the adjusted position of said first rack member;
   (c) a plurality of totalizer lines adapted, when selected, to receive information inserted into the business machine apparatus;
   (d) means when actuated for selecting one of said totalizer lines;
   (e) programming means for allowing any of said control keys to select any of said totalizer lines including a plurality of differentially settable coded members each having a predetermined number of apertures in selected positions thereon;
   (f) means interconnecting said second set of rack members with said coded members to position said coded members commensurate with the settable position of said second set of rack members;
   (g) means for sensing aligned apertures in each of said coded members, said means establishing a control position upon sensing aligned apertures in the coded members;
   (h) and control means operated by those sensing means in a control position to actuate said selecting means whereby one of said totalizer lines is selected to receive information inserted into the machine apparatus.

2. The business machine apparatus of claim 1 in which:
   said coded members comprise matrix plates having a predetermined number of control areas located thereon, each control area positioned on said matrix plates to control the selection of one of said totalizer lines, and said sensing means comprising pin members for sensing aligned apertures in each of said control areas whereby, upon sensing aligned apertures in a control area, said pin will protrude from said matrix plates to establish the control position for actuation of the corresponding totalizer line for the control area.

3. The business machine apparatus of claim 1 in which said totalizer lines each include a plurality of totalizer elements mounted on a support member adapted for moving said elements to an information-receiving position;
   (a) actuating means mounted for movement to an operated position during each machine operation;
   (b) said selecting means includes a plurality of control members mounted adjacent said actuating means and each engaging one of said support members, each of said control members being adapted for movement to a position engaging said actuating means when operated;

(c) and said control means engages said control members and is adapted to operate said control members, upon operation by said sensing means, whereby, upon movement of said actuating means to an operated position, said control members is moved to actuate the support members to move the totalizer elements to an information-receiving position.

4. The business machine apparatus of claim 3 in which:

said actuating means includes a link member containing a control aperture for each totalizer line, said link member being adapted for movement during a machine operation;

said control means includes a feeler member for each totalizer line, said feeler member mounted adjacent said coded members and adapted to be actuated by said sensing means in a control position;

and said control member comprises an arm mounted on each of said feeler members and positioned adjacent the control aperture of said link member, said arm being adapted to be moved into engagement with the control aperture upon actuation of said feeler member whereby the movement of said link member will move the totalizer elements to an information-receiving position.

5. The business machine apparatus of claim 4 in which:

said actuating means includes a second link member containing a plurality of control apertures;

said control means includes a second feeler member for each totalizer line, said feeler members mounted adjacent said coded members and adapted to be actuated by said sensing means in a control position;

said selecting means includes a second control member mounted adjacent said actuating means and engaging said support member;

and said control member comprises an arm mounted on each of said second feeler members and positioned adjacent the control aperture of said second link member, said arm being adapted to be moved into engagement with the control aperture upon actuation of said second feeler member whereby the movement of said second link member will move the totalizer elements to an information-receiving position.

6. The business machine apparatus of claim 5 in which said first link member is adapted for movement during an add operation of the machine and said second link member is adapted for movement during a reset operation of the machine.

7. The business machine apparatus of claim 5 which includes:

a third link member mounted adjacent both said first and second link members, said third link member having a plurality of apertures positioned adjacent said support members;

an actuating member mounted on each of said support members, said actuating members being adapted to be positioned within the apertures of said third link member upon actuation of its associated feeler member;

and means for moving said third link member during a reset operation of said machine apparatus whereby the support member whose actuating members were positioned within the apertures of said third link are actuated to remove its associated arm from engagement with the apertures of said first and second link members.

8. In a business machine apparatus constructed and arranged to perform a machine operation and including a plurality of printing mechanisms for printing information generated by said machine operation, the combination including:

(a) a plurality of selectively depressible amount keys for entering information into said machine apparatus;

(b) a plurality of rows of selectively depressible control keys;

(c) a first set of differentially settable rack members for each row of control keys, said rack members being adapted for movement to a position commensurate with the control key depressed;

(d) a second set of differentially settable rack members for each set of said first rack members, said second set being adapted for movement to a position commensurate with the adjusted position of said first rack members;

(e) a plurality of lines of totalizer elements;

(f) support means for each line of totalizer elements, said support means being adapted, when actuated, to move its associated line of totalizer elements into a position to receive information entered into the machine apparatus by said amount keys;

(g) means, when actuated, for operating said printing mechanisms;

(h) programming means for allowing any of said control keys to select any of said totalizer lines for movement into an information-receiving position and to operate any of the printing mechanisms, including a pair of matrix plates for each row of control keys, each of said plates being engaged by one of said second set of rack members and being adapted for movement by said rack members to a position commensurate with the control key depressed, said matrix plates containing a plurality of predetermined positioned control holes;

(i) sensing pins mounted adjacent said matrix plates and adapted to sense for aligned control holes in said matrix plates after said matrix plates have been moved by the second set of rack members, said pins upon sensing aligned holes in each of said matrix plates will extend from said plates;

(j) a first and second set of feeler members mounted adjacent the matrix plates and adapted for movement to engage those sensing pins extending from said matrix plates;

(k) first means connected between the first set of said feeler members and said support means to actuate said support means upon engagement of its associated feeler member with one of the extended sensing pins, thereby moving its associated line of totalizer elements into an information-receiving position;

(l) and other means connected between said operating means and said second set of feeler members to actuate said operating means upon engagement of its associated feeler member with one of the extended sensing pins whereby said printing mechanism is operated.

9. The business machine apparatus of claim 8 in which:

each of said matrix plates includes a plurality of sets of control areas, each set including a control area for controlling the selection of each line of totalizer elements and one of said printing mechanisms;

said first set of feeler members includes a feeler member mounted adjacent each totalizer line control area of the matrix plates;

and said second set of feeler members includes a feeler member mounted adjacent each printing mechanism control area whereby upon engaging an extended sensing pin it its associated control area, both first and second sets of feeler members will actuate its associated line of totalizer elements and printing mechanism.

10. The business machine apparatus of claim 9 in which said printer mechanism operating means includes:

a plurality of segment members each controlling the operation of a printing mechanism said segment members being adapted for rotation, the extent of which controls the printer mechanism to operate in a predetermined manner;

each of said second set of feeler members having a plurality of stepped feeler portions;

and means interconnecting each of said second set of feeler members with one of said segment members whereby upon one of said stepped portions of the feeler members engaging an extended sensing pin, the associated segment member will be rotated an extent which controls the printing mechanism too operate in a predetermined manner.

11. In a business machine apparatus constructed and arranged to perform various types of machine operations and including a plurality of selectively depressible control keys, the combination including:
(a) a first differentially settable member adjusted to a position commensurate with a control key depressed;
(b) a pair of second differentially settable members adjusted to a position commensurate with the adjusted position of said first differentially settable member;
(c) a line of totalizer elements;
(d) means for supporting said totalizer elements and adapted, when rotated, for moving said totalizer elements to a position to receive information into the machine apparatus;
(e) a pair of matrix plates each containing a predetermined number of holes in selected positions thereon, each of said plates engaged by one of said second differentially settable members and moved to a position commensurate with the adjusted position of said settable members;
(f) a plurality of sensing pins for sensing aligned holes in said matrix plates, said pins protruding from said matrix plates upon sensing aligned holes;
(g) a first and second feeler member rotatably supported on said supporting means, said feeler members positioned adjacent the sensing pins protruding from said matrix plates;
(h) a first actuating member mounted adjacent said first feeler member, said actuating member having a control aperture;
(i) a second actuating member mounted adjacent said second feeler member, said second actuating member having a control aperture;
(j) a control member mounted on each of said first and second feeler members, said control members positioned adjacent said supporting means and the control aperture of said actuating member and adapted to be positioned within said apertures upon rotation of its associated feeler member;
(k) means to move said feeler members in a direction to sense for a sensing pin protruding from said matrix plates, said feeler members being rotated upon engagement with one of said protruding sensing pins;
(l) and other means for actuating said first and second actuating members during a machine operation whereby said control members positioned within the aperture of said actuating member will engage and rotate said supporting means to position the line of totalizer elements in an information-receiving position.

12. The machine apparatus of claim 11 in which said first actuating member is operated during an add operation of the machine and said second actuating member is operated during a reset operation of the machine.

13. The machine apparatus of claim 11 which includes:
(a) a third actuating member mounted adjacent said first and second actuating members, said third actuating member having a control aperture;
(b) a rod member mounted on said supporting means and positioned adjacent said control aperture of the third actuating member, said rod member being adapted to be positioned within said aperture upon rotation of said suporting means;
(c) and means for actuating said third actuating member in a direction whereby said rod member is moved to rotate said supporting means to move the totalizer line from its information-receiving position.

14. In a business machine apparatus constructed and arranged to perform various types of machine operations and including a plurality of selectively depressible control keys, the combination including:
(a) a first differentially settable member adjusted to a position commensurate with the control key depressed;
(b) a first and second rack member slidably mounted adjacent said first differentially settable member;
(c) gear means interconnecting said first differentially settable member and each of said rack members, said gear means adapted to sequentially move each of said rack members through a plurality of distinct key-representing positions upon movement of said first settable member to an adjusted position, one of said rack members being positioned commensurate with the control key depressed;
(d) a plurality of lines of totalizer elements adapted, when selected, to be moved to a position to receive information inserted into the business machine apparatus;
(e) means, when actuated, for selecting one of said totalizer lines;
(f) a pair of matrix plates each containing a predetermined number of apertures in selected locations thereon, each of said plates being connected to one of said rack members and adapted for movement by said rack members to a position commensurate with the control key depressed;
(g) means for sensing aligned apertures in each of said matrix plates, said sensing means establishing a control position upon sensing aligned apertures in the matrix plates;
(h) and control means operated by those sensing means in a control position to actuate said selecting means whereby one of said totalizer lines is selected to receive information inserted into the machine apparatus.

15. The business machine apparatus of claim 14 in which:
said plurality of depressible control keys comprises a first and a second set of control keys;
said first differentially settable member is adjusted to a position commensurate with the depression of a control key in either of said first and second set of control keys;
and said gear means is operated by said first differentially settable member when moved to its adjusted position to position said first rack member commensurate with a control key of said first set being depressed and to position said second rack member commensurate with a control key of said second set being depressed.

16. The business machine apparatus of claim 15 in which:
each of said rack members has a large tooth portion;
and said gear means is adapted to sequentially engage and disengage each of the large tooth portions of each rack member whereby said first rack member is first moved through positions representing the control keys of said first set and subsequently said second rack member is moved through positions representing the control keys of said second set.

17. The business machine apparatus of claim 16 in which said gear means contains a pair of cut-out portions each of which engages one of the large tooth portions of the rack members, said cut-out portions being located on said gear means whereby one of said rack members will be positioned commensurate with the control key depressed and the other rack member will be positioned in a neutral or non-controlling position.

18. The business machine apparatus of claim 17 in which each of said rack members has a depending member engaging one of said matrix plates to move the plates to a position commensurate with the position of said rack member; and each of said matrix plates containing a plurality of rows of apertures located so as to be in alignment with said sensing means when said rack member is in a neutral or non-controlling position.

19. In a business machine apparatus constructed and arranged to perform various types of machine operations and including a plurality of selectively depressible control keys, the combination including:
 (a) a differentially settable member adjusted to a position commensurate with a control key depressed;
 (b) a line of totalizer elements controlled by said control keys and adapted for movement to a position for receiving information inserted into said machine apparatus;
 (c) means, when actuated, for shifting the line of totalizer elements to position one of the totalizer elements to receive information inserted into said machine apparatus;
 (d) a pair of matrix plates each containing a predetermined number of holes in selected positions thereon, said plates being adapted for movement to a position commensurate with the adjusted position of said settable member;
 (e) means for sensing aligned holes in said matrix plates, said means establishing a control position upon sensing aligned holes in said plates;
 (f) first actuating means controlled by the sensing means in a control position for actuating said shifting means;
 (g) and second actuating means operated during a machine operation for moving said shifted totalizer elements to an information-receiving position.

20. The machine apparatus of claim 19 in which the holes in each of said matrix plates comprise a plurality of control areas, one of said areas controlling the totalizer line;
 said sensing means includes a plurality of pin members for sensing aligned holes in the control areas of the matrix plates which control the shifting of said totalizer line;
 and means for controlling said first actuating means to sense the pin members in a control position in those areas which control the shifting of the totalizer line whereby the totailzer line is shifted to a position for movement to an information receiving position.

21. The machine apparatus of claim 20 which includes:
 (a) means for supporting each of said totalizer lines for lateral movement;
 (b) said shifting means includes a pair of control members slidably mounted adjacent each of said supporting means, each of said control members containing an aperture and having a sensing portion positioned adjacent the shifting control area of said matrix plates, the sensing portions positioned opposite from each other;
 (c) an abutment member mounted on each totalizer line and positioned within the apertures of both of its associated control members, to shift the totalizer line in a lateral direction commensurate with the positioning of both apertures;
 (d) cam means interconnecting both of said control members, said cam means adapted, when actuated, to move the sensing portion of both control members together;
 (e) means for moving said pin members in a sensing direction to sense aligned holes in said shifting control areas of said matrix plates;
 (f) and means engaging said cam means to actuate said cam means to allow the sensing portions of both control members to sense a pin member in a control position whereby the totalizer line is shifted a distance commensurate with the position of the pin member in the control position.

References Cited

UNITED STATES PATENTS

| | | | |
|---|---|---|---|
| 3,013,717 | 12/1961 | Mehan et al. | 235—60.48 |
| 3,263,915 | 8/1966 | Englund et al. | 235—60 |
| 3,279,694 | 10/1966 | Barnes et al. | 235—60.48 |
| 3,335,947 | 8/1967 | Edwards et al. | 235—60.48 |

RICHARD B. WILKINSON, *Primary Examiner.*

S. A. WAL, *Assistant Examiner.*